US005974228A

United States Patent [19]
Heitsch

[11] Patent Number: 5,974,228
[45] Date of Patent: Oct. 26, 1999

[54] IMAGE RENDITION BY PLURAL-ROW ERROR DIFFUSION, FOR FASTER OPERATION AND SMALLER INTEGRATED CIRCUITS

[75] Inventor: Irene Heitsch, San Marcos, Calif.

[73] Assignee: Hewlett-Packard Company, Palo Alto, Calif.

[21] Appl. No.: 08/789,859

[22] Filed: Jan. 28, 1997

[51] Int. Cl.$^6$ .............................. B41B 15/00; G06K 9/36; G06K 9/38; H04N 1/04

[52] U.S. Cl. ........................ 395/109; 395/109; 395/115; 382/237; 382/252; 382/270; 358/496; 358/499; 358/500; 358/501

[58] Field of Search ..................................... 358/500, 501, 358/496, 499; 395/115, 114, 109; 382/237, 252, 270

[56] References Cited

U.S. PATENT DOCUMENTS

| | | | |
|---|---|---|---|
| 4,891,710 | 1/1990 | Nakazato et al. | 358/443 |
| 5,121,447 | 6/1992 | Tanioka et al. | 382/268 |
| 5,271,070 | 12/1993 | Truong et al. | 382/50 |
| 5,553,165 | 9/1996 | Webb et al. | 382/252 |
| 5,561,536 | 10/1996 | Sugiura et al. | 358/500 |
| 5,604,605 | 2/1997 | Moolenaar | 358/456 |

Primary Examiner—Edward L. Coles
Assistant Examiner—Twyler Lamb

[57] ABSTRACT

This system and method error-diffuse image data to generate printing decisions; scan and print stages are preferably included. Multiple image-data rows are held in longterm memory, usually external to an integrated circuit that does the processing; preferably data from plural rows at a time are received from that memory. Error from earlier-processed data is also held in longterm memory and fed to the circuit. Longterm-memory access is shared with many other functions; the invention keeps error diffusion from dominating that access. Processing preferably proceeds generally transverse (preferably skewed, ideally at 45°) to data rows, with final error distribution into each pixel when it is the "left pixel" (or when it is the "next pixel" if it is at the top of a row group). For pixels at the top of each run, the circuit retrieves error from, and for pixels at the bottom the circuit deposits error into, longterm memory; for intermediate pixels the circuit does neither—thus amortizing each data access over several pixels. Preferably plural rows are preprocessed to impart a skewed structure and also insert dummy pixels at corners (to simplify repetitive processing)—ideally with data and dummy pixels together forming a parallelogram, the dummy pixels being outboard at both sides of the data. Data can be padded out internally, too, for calorimetric improvement, if correspondingly finer printing resolution is available. In one form of the invention two or more (e. g., four) current pixels are processed simultaneously.

39 Claims, 31 Drawing Sheets

| Associated Registers | | | | | | |
|---|---|---|---|---|---|---|
| Name | Num | Data.15<br>Data.11<br>Data.7<br>Data.3 | Data.14<br>Data.10<br>Data.6<br>Data.2 | Data.13<br>Data.9<br>Data.5<br>Data.1 | Data.12<br>Data.8<br>Data.4<br>Data.0 | |
| ERRdifResetWr | | largerandshift.1<br>-<br>-<br>- | largerandshift.0<br>-<br>softpurge<br>- | smallrandshift.1<br>-<br>resetoddcol<br>- | smallrandshift.0<br>-<br>-<br>- | initialize successive images |
| ERRdifRandSeedWr | | whichextrabit.2<br>shfregout.11<br>shfregout.7<br>shfregout.3 | whichextrabit.1<br>shfregout.10<br>shfregout.6<br>shfregout.2 | whichextrabit.0<br>shfregout.9<br>shfregout.5<br>shfregout.1 | shfregout.12<br>shfregout.8<br>shfregout.4<br>shfregout.0 | randomization setup |
| ERRdifModeWr<br>specialmode:<br>300x600 K, 150x300 color<br>or 300x600 K only | | passthrough<br>blackvrtres<br>colorvrtres<br>wrdmaenable | blackprintlevel.1<br>colorprintlevel.1<br>specialmode<br>- | blackprintlevel.0<br>colorprintlevel.0<br>rndenable<br>- | blackhrzres<br>colorhrzres<br>rddmaenable<br>- | accommodating various print modes |
| ERRdifKThreshWr | | kthresh0.7<br>kthresh0.3<br>kthresh1.7<br>kthresh1.3 | kthresh0.6<br>kthresh0.2<br>kthresh1.6<br>kthresh1.2 | kthresh0.5<br>kthresh0.1<br>kthresh1.5<br>kthresh1.1 | kthresh0.4<br>kthresh0.0<br>kthresh1.4<br>kthresh1.0 | |
| ERRdifKShadeWr | | kthresh2.7<br>kthresh2.3<br>kshade2.7<br>kshade2.3 | kthresh2.6<br>kthresh2.2<br>kshade2.6<br>kshade2.2 | kthresh2.5<br>kthresh2.1<br>kshade2.5<br>kshade2.1 | kthresh2.4<br>kthresh2.0<br>kshade2.4<br>kshade2.0 | setting output print levels |
| ERRdifCThreshWr | | cthresh0.7<br>cthresh0.3<br>cthresh1.7<br>cthresh1.3 | cthresh0.6<br>cthresh0.2<br>cthresh1.6<br>cthresh1.2 | cthresh0.5<br>cthresh0.1<br>cthresh1.5<br>cthresh1.1 | cthresh0.4<br>cthresh0.0<br>cthresh1.4<br>cthresh1.0 | |
| ERRdifCShadeWr | | cthresh2.7<br>cthresh2.3<br>cshade2.7<br>cshade2.3 | cthresh2.6<br>cthresh2.2<br>cshade2.6<br>cshade2.2 | cthresh2.5<br>cthresh2.1<br>cshade2.5<br>cshade2.1 | cthresh2.4<br>cthresh2.0<br>cshade2.4<br>cshade2.0 | |
| ERRdifRdDMAAddrHiWr | | -<br>-<br>-<br>rddmaaddr.18 | -<br>-<br>-<br>rddmaaddr.17 | -<br>-<br>-<br>rddmaaddr.16 | -<br>-<br>rddmaaddr.19<br>rddmaaddr.15 | configuring read & write buffers (DRAM) |
| ERRdifRdDMALoWr | | rddmaaddr.14<br>rddmaaddr.10<br>rddmaaddr.6<br>rddmaaddr.2 | rddmaaddr.13<br>rddmaaddr.9<br>rddmaaddr.5<br>rddmaaddr.1 | rddmaaddr.12<br>rddmaaddr.8<br>rddmaaddr.4<br>rddmaaddr.0 | rddmaaddr.11<br>rddmaaddr.7<br>rddmaaddr.3<br>whichbyte | |
| ERRdifWrDMAAddrHiWr | | -<br>-<br>-<br>wrdmaaddr.18 | -<br>-<br>-<br>wrdmaaddr.17 | -<br>-<br>-<br>wrdmaaddr.16 | -<br>-<br>wrdmaaddr.19<br>wrdmaaddr.15 | |
| ERRdifWrDMAAddrLoWr | | wrdmaaddr.14<br>wrdmaaddr.10<br>wrdmaaddr.6<br>wrdmaaddr.2 | wrdmaaddr.13<br>wrdmaaddr.9<br>wrdmaaddr.5<br>wrdmaaddr.1 | wrdmaaddr.12<br>wrdmaaddr.8<br>wrdmaaddr.4<br>wrdmaaddr.0 | wrdmaaddr.11<br>wrdmaaddr.7<br>wrdmaaddr.3<br>- | |

For 300x300 black with 300x300 cyan, magenta and yellow:
set: rddmaaddr[19:0]=wrdmaaddr[19:0]+10
whichbyte=0
clear error buffer
starting at: rddmaaddr,
ending at: rddmaaddr+(length of output row in pixels)*2
set: blackhrzres=0
blackvrtres=0
colorhrzres=0
colorvrtres=0

For 300x300 black only:
set: rddmaaddr[19:0]=wrdmaaddr[19:0]+2
whichbyte=1
clear error buffer
starting at: rddmaaddr
ending at: rddmaaddr+
(length of output row in pixels)/2+8
(round up fractions)
set: blackhrzres=0
blackvrtres=0
colorprintlevel[1:0]=0
colorhrzres=0
colorvrtres=0

For 300x300 cyan, magenta and yellow only:
set: rddmaaddr[19:0]=wrdmaaddr[19:0]+7
whichbyte=1
clear error buffer
starting at: rddmaaddr
ending at: rddmaaddr+(length of output row in pixels)*(3/2)+8
(round up fractions)
set: blackprintlevel[1:0]=0
blackhrzres=0
blackvrtres=0
colorhrzres=0
colorvrtres=0

FIG. 15a-2

For 600x600 black with 300x300 cyan, magenta and yellow:
set:           rddmaaddr[19:0]=wrdmaaddr[19:0]+12
               whichbyte=0
clear error buffer
starting at:   rddmaaddr
ending at:     rddmaaddr+(length of output row in pixels)*(5/4)+8
               (round up fractions)

set:           blackhrzres=1
               blackvrtres=1
               colorhrzres=0
               colorvrtres=0

For 600x600 black only:
set:           rddmaaddr[19:0]=wrdmaaddr[19:0]+4
               whichbyte=1
clear error buffer
starting at:   rddmaaddr
ending at:     rddmaaddr+(length of output row in pixels)/2+8
               (round up fractions)

set:           blackhrzres=1
               blackvrtres=1
               colorprintlevel[1:0]=0
               colorhrzres=0
               colorvrtres=0

FIG. 15b

For 300x600 black with 150x300 cyan, magenta and yellow:
set:  rddmaaddr[19:0]=wrdmaaddr[19:0]+12
  whichbyte=0
clear error buffers
starting at:  rddmaaddr
ending at:  rddmaaddr+(length of output row in pixels)*(5/4)+8
  (round up fractions)

set:  blackhrzres=0
  blackvrtres=1
  colorhrzres=0
  colorvrtres=0

For 300x300 black with 600x600 cyan, magenta and yellow:
set:  rddmaaddr[19:0]=wrdmaaddr[19:0]+16
  whichbyte=0
clear error buffers
starting at:  rddmaaddr
ending at:  rddmaaddr+(length or output row in pixels)*(7/4)+8
  (round up fractions)

set:  blackhrzres=0
  blackvrtres=0
  colorhrzres=1
  colorhrzres=1

FIG. 15c

For 300x600 black only:
set: rddmaaddr[19:0]=wrdmaaddr[19:0]+4
whichbyte=1
clear error buffers
starting at: rddmaaddr
ending at: rddmaaddr+(length of output row in pixels)/2+8
(round up fractions)
set: blackhrzres=0
blackvrtres=1
colorprintlevel[1:0]=0
colorhrzres=0
colorvrtres=0

Setting the Output Print Level
black:
set: blackprintlevel[1:0]=1
kthresh0[7:0]=128
kthresh1[7:0]=0
kthresh2[7:0]=0
For 3 level black:
set: blackprintlevel[1:0]=2
kthresh0[7:0]=64
kthresh1[7:0]=192
kthresh2=0
kshade2=127
For 4 level black:
set: blackprintlevel[1:0]=3
kthresh0[7:0]=43
kthresh1[7:0]=128
kthresh2=213
kshade2=85
For binary cyan, magenta and yellow:
set: colorprintlevel[1:0]=I
cthresh0[7:0]=128
cthresh1[7:0]=0
cthresh2[7:0]=0

FIG. 15d

For 3 level cyan, magenta and yellow:
set:      colorprintlevel[1:0]=2
            cthresh0[7:0]=64
            cthresh1[7:0]=192
            cthresh2=0
            cshade2=127

For 4 level cyan, magenta and yellow:
set:      colorprintlevel[1:0]=3
            cthresh0[7:0]=43
            cthresh1[7:0]=128
            cthresh2=213
            cshade2=85

To enable random number generator:
set:      rndenable=1
            whichextrabit=whatever bit source you want to use to add more variety to the random number sequence shfregout[12:0]=initial value for linear feedback shift register largerandshift[1:0]=how many times do you want to divide your larger random number by 2 smallrandshift[1:0]=how many times do you want to divide your smaller random number by 2

To reset between images:
clear error buffer. If new image has identical resolution and print levels as previous one, clear the same addresses.
set:      softpurge=1
            resetoddcol=1

| Bit Descriptions | | | |
|---|---|---|---|
| Register | Bit Name | Reset Value | Functional Description |
| ERRdifResetWr | largerandshift[1:0] | 0 | Large Random Shift. Amount that largerand is right shifted. Used to restrict the range of the large random number and therefore reduce the amount of noise added to the 7/16 and 5/16 weights.<br>0 - max random noise<br>1 - roughly 1/2 the noise at 0 setting<br>2 - roughly 1/4 the noise at 0 setting<br>3 - roughly 1/8 the noise at 0 setting |
| | smallrandshift[1:0] | 0 | Small Random Shift. Amount that smallrand is right shifted. Used to restrict the range of the small random number and therefore reduce the amount of noise added to the 3/16 and 1/16 weights.<br>0 - max random noise<br>1 - roughly 1/2 the noise at 0 setting<br>2 - roughly 1/4 the noise at 0 setting<br>3 - roughly 1/8 the noise at 0 setting |
| | softpurge | | Purge fifos, zero out the output registers and intermediate error storage. Needs to be written before every new image |
| | resetoddcol | | Reset flip flop that tracks odd and even columns. Needs to be written before every new image |
| ERRdifRandSeedWr | whichextrabit[2:0] | 2 | Which Extra Bit? Determines which bit is to be shifted in to linear feedback shift register random number generator.<br>0: 0<br>1: $1^1$<br>2: lsb of black value ( or if image is cmy only, lsb of cyan value)<br>3: free counter lsb<br>4: cpudatain bit 0<br>5: cpudatain bit 1<br>6: A /D bit 0<br>7: gpio1 |

FIG. 16a

| Bit Descriptions | | | |
|---|---|---|---|
| Register | Bit Name | Reset Value | Functional Description |
| | shfregout[12:0] | 0 | initial value for linear feedback shift register, selected bits are used to form random values to add to the error diffusion weights [2] |
| ERRdifModeWr | passthrrough | 1 | Passthrough. Passthrough all eight bits of all four color planes unchanged |
| | blackprintlevel[1:0] | 1 | Black Print Value. Sets the maximum print level for the black plane.<br>0: no print<br>1: binary<br>2: three level<br>3: four level |
| | blackhrzres | 0 | Black Horizontal Resolution. Sets the output horizontal resolution relative to the input resolution.<br>(0 - 1x, 1 - 2x) |
| | blackvrtres | 0 | Black Vertical Resolution. Sets the output vertical resolution relative to the input resolution.<br>(0 - 1x, 1 - 2x) |
| | colorprintlevel[1:0] | 1 | Color Print Level. Sets the maximum print level for the 3 color planes (CMY).<br>0: no print<br>1: binary<br>2: three level<br>3: four level |
| | colorhrzres | 0 | Color Horizontal Resolution. Sets the output color horizontal resolution relative to the input resolution.<br>(0 - 1x or 0.5x, 1 - 2x) |
| | colorvrtres | 0 | Color Vertical Resolution. Sets the output color vertical resolution relative to the input resolution.<br>(0 - 1x, 1 - 2x) |
| | specialmode | 0 | Special Print Mode.<br>set if print mode is 300x600 black 150x300 color or 300x600 black only. |
| | rndenable | 0 | Random Enable. Setting this bit will enable a random value added to the propagated weights. |
| | rddmaenable | 0 | Read DMA Enable. Setting this bit will enable the DMA channel to read errors stored in DRAM. |
| | wrdmaenable | 0 | Write DMA Enable. Setting this bit will enable the DMA channel to write errors to DRAM. |
| ERRdifKThreshWr | kthresh0[7:0] | 128 | first threshold black input value is compared to<br>128: binary<br>64: three level<br>43: four level |
| | kthresh1[7:0] | 0 | second threshold black input value is compared to<br>0: binary<br>192: three level<br>128: four level |
| | kthresh2[7:0] | 0 | third threshold black input value is compared to<br>0: binary<br>0: three level |

FIG. 16b

| Bit Descriptions | | | |
|---|---|---|---|
| Register | Bit Name | Reset Value | Functional Description |
| | | | 213: four level |
| | kshade2[7:0] | 0 | amount to be subtracted from error if black input value is greater than kthresh0 and less than kthresh1<br>X: binary<br>127: three level<br>85: four level |
| ERRdifCThreshWr | cthresh0[7:0] | 128 | first threshold color input value is compared to<br>128: binary<br>64: three level<br>43: four level |
| | cthresh1[7:0] | 0 | second threshold color input value is compared to<br>0: binary<br>192: three level<br>128: four level |
| ERRdifCShadeWr | cthresh2[7:0] | 0 | third threshold color input value is compared to<br>0: binary<br>0: three level<br>213: four level |
| | chade2[7:0] | 0 | amount to be subtracted from error if color input value is greater than cthresh0 and less than cthresh1<br>X: binary<br>127: three level<br>85: four level |
| ERRdifRdDMAAddrHiWr | rddmaaddr[19:15] | 0 | 5 highest order bits of read DMA start address |
| ERRdifRdDMAAddrLoWr | rddmaaddr[14:0] | 0 | 15 lowest order bits of read DMA start address (short address, not byte address) |
| | whichbyte | | which byte of the first word read in by the DMA is the first valid byte |
| ERRdifWrDMAAddrHiWr | wrdmaaddr[19:15] | 0 | five highest order bits of write start address |
| ERRdifWrDMAAddrLoWr | wrdmaaddr[14:0] | 0 | 15 lowest order bits of write DMA start address (short address, not byte address) |

FIG. 16c

| Associated Registers | | | | | | |
|---|---|---|---|---|---|---|
| Name | Num | Data.15<br>Data.11<br>Data.7<br>Data.3 | Data.14<br>Data.10<br>Data.6<br>Data.2 | Data.13<br>Data.9<br>Data.5<br>Data.1 | Data.12<br>Data.8<br>Data.4<br>Data.0 | |
| SkewCtrlWr | 224 | - | - | - | - | |
| | | - | - | - | - | |
| | | - | - | - | - | |
| | | - | - | mode.1 | mode.0 | |

FIG. 17

| Bit Descriptions | | | |
|---|---|---|---|
| Register | Bit Name | Reset Value | Functional Description |
| SkewCtrlWr | mode[1:0] | 0 | 0: Pass Through Mode<br>1: 300x600 Black/150x300 Color Mode<br>2: 300x300 Black/300x300 Color Mode<br>3: 600x600 Black/600x600 Color, 300x300 Black/600x600 Color, and 600x600 Black/300x300 Color Modes |

300x300 Black/300x300 Color Mode
    First Set of Four Output Rows (Black and Color)
        00 04 08 12 *00 00 00*
        *00* 01 05 09 13 *00 00*
        *00 00* 02 06 10 14 *00*
        *00 00 00* 03 07 11 15

Second Set of Four Output Rows (Black and Color)
        16 20 24 28 *00 00 00*
        *00* 17 21 25 29 *00 00*
        *00 00* 18 22 26 30 *00*
        *00 00 00* 19 23 27 31

FIG. 18b

600x600 Black/600x600 Color Mode
300x300 Black/600x600 Color Mode
600x600 Black/300x300 Color Mode
    First Set of Four Output Rows (Black and Color)
        00 00 04 04 08 08 12 12 *00 00 00 00 00 00 00*
        *00* 00 00 04 04 08 08 12 12 *00 00 00 00 00 00*
        *00 00* 01 01 05 05 09 09 13 13 *00 00 00 00 00*
        *00 00 00* 01 01 05 05 09 09 13 13 *00 00 00 00*
        *00 00 00 00* 02 02 06 06 10 10 14 14 *00 00 00*
        *00 00 00 00 00* 02 02 06 06 10 10 14 14 *00 00*
        *00 00 00 00 00 00* 03 03 07 07 11 11 15 15 *00*
        *00 00 00 00 00 00 00* 03 03 07 07 11 11 15 15

Second Set of Four Output Rows (Black and Color)
        16 16 20 20 24 24 28 28 *00 00 00 00 00 00 00*
        *00* 16 16 20 20 24 24 28 28 *00 00 00 00 00 00*
        *00 00* 17 17 21 21 25 25 29 29 *00 00 00 00 00*
        *00 00 00* 17 17 21 21 25 25 29 29 *00 00 00 00*
        *00 00 00 00* 18 18 22 22 26 26 30 30 *00 00 00*
        *00 00 00 00 00* 18 18 22 22 26 26 30 30 *00 00*
        *00 00 00 00 00 00* 19 19 23 23 27 27 31 31 *00*
        *00 00 00 00 00 00 00* 19 19 23 23 27 27 31 31

FIG. 18c

<u>300x600 Black/150x300 Color Mode</u>

First Set of Four Output Rows (Black)
```
00 04 08 12 00 00 00 00 00 00 00
00 00 04 08 12 00 00 00 00 00 00
00 00 01 05 09 13 00 00 00 00 00
00 00 00 01 05 09 13 00 00 00 00
00 00 00 00 02 06 10 14 00 00 00
00 00 00 00 00 02 06 10 14 00 00
00 00 00 00 00 00 03 07 11 15 00
00 00 00 00 00 00 00 03 07 11 15
```

Second Set of Four Output Rows (Black)
```
16 20 24 28 00 00 00 00 00 00 00
00 16 20 24 28 00 00 00 00 00 00
00 00 17 21 25 29 00 00 00 00 00
00 00 00 17 21 25 29 00 00 00 00
00 00 00 00 18 22 26 30 00 00 00
00 00 00 00 00 18 22 26 30 00 00
00 00 00 00 00 00 19 23 27 31 00
00 00 00 00 00 00 00 19 23 27 31
```

First Set of Four Output Rows (Color)
```
00 02 06 10 06 00 00 00 00 00 00
00 02 06 10 06 00 00 00 00 00 00
00 00 01 03 07 11 07 00 00 00 00
00 00 01 03 07 11 07 00 00 00 00
00 00 00 00 01 04 08 12 07 00 00
00 00 00 00 01 04 08 12 07 00 00
00 00 00 00 00 00 02 05 09 13 08
00 00 00 00 00 00 02 05 09 13 08
```

Second Set of Four Output Rows (Color)
```
08 18 22 26 14 00 00 00 00 00 00
08 18 22 26 14 00 00 00 00 00 00
00 00 09 19 23 27 15 00 00 00 00
00 00 09 19 23 27 15 00 00 00 00
00 00 00 00 09 20 24 28 15 00 00
00 00 00 00 09 20 24 28 15 00 00
00 00 00 00 00 00 10 21 15 29 16
00 00 00 00 00 00 10 21 15 29 16
```

FIG. 20

| Name | Num | Data.15 Data.11 Data.7 Data.3 | Data.14 Data.10 Data.6 Data.2 | Data.13 Data.9 Data.5 Data.1 | Data.12 Data.8 Data.4 Data.0 |
|---|---|---|---|---|---|
| *Associated Registers* | | | | | |
| BitPackBlkAddr0Wr | 207 | addr.15 addr.11 addr.7 addr.3 | addr.14 addr.10 addr.6 addr.2 | addr.13 addr.9 addr.5 addr.1 | addr.12 addr.8 addr.4 addr.0 |
| BitPackBlkAddr1Wr | 208 | - - - addr.19 | - - - addr.18 | - - - addr.17 | - - - addr.16 |
| BitPackClrAddr0Wr | 209 | addr.15 addr.11 addr.7 addr.3 | addr.14 addr.10 addr.6 addr.2 | addr.13 addr.9 addr.5 addr.1 | addr.12 addr.8 addr.4 addr.0 |
| BitPackClrAddr1Wr | 210 | - - - addr.19 | - - - addr.18 | - - - addr.17 | - - - addr.16 |
| BitPackCntrl0Wr | 211 | - colormode.0 coloroddcolen blackoddcolen | endofrowen blackmode.1 colorevencolen blackevencolen | skeweddata blackmode.0 coloroddrowen blackoddrowen | colormode.1 eightrowmode colorevenrowen blackevenrowen |
| BitPackCntrl1Wr | 212 | - - - - | - - - purgeclr | - - - purgeblk | - - - setstartup |
| BitPackRd | 64 | - - clrfifofull.3 blkfifofull.3 | - clrdmaactive clrfifofull.2 blkfifofull.2 | - blkdmaactive clrfifofull.1 blkfifofull.1 | - endoflastrow clrfifofull.0 blkfifofull.0 |

FIG. 21

| Black Res. | Black Format | Color Res. | Color Format | Black Row Enable (OE) | Black Column Enable (OE) | Color Row Enable (OE) | Color Column Enable (OE) | Eight Row Mode | Black mode [1:0] | Color mode [1:0] |
|---|---|---|---|---|---|---|---|---|---|---|
| - | - | 3x3 | 8-bit RGB | 00 | 00 | 11 | 11 | 0 | - | 00 |
| 3x3 | 8-bit K | - | - | 11 | 11 | 00 | 00 | 0 | 00 | - |
| 3x3 | 4-bit K | - | - | 11 | 11 | 00 | 00 | 0 | 11 | - |
| - | - | 3x3 | 1-bit CMY | 00 | 00 | 11 | 11 | 0 | - | 01 |
| 3x3 | 1-bit K | 3x3 | 1-bit CMY | 11 | 11 | 11 | 11 | 0 | 01 | 01 |
| 3x3 | 1-bit K | - | - | 11 | 11 | 00 | 00 | 0 | 01 | - |
| 3x3 | 2-bit K | - | - | 11 | 11 | 00 | 00 | 0 | 10 | - |
| 3x3 | 2-bit K | 3x3 | 1-bit CMY | 11 | 11 | 11 | 11 | 0 | 10 | 01 |
| 3x3 | 2-bit K | 3x3 | 2-bit CMY | 11 | 11 | 11 | 11 | 0 | 10 | 10 |
| 6x6 | 1-bit K | 3x3 | 1-bit CMY | 11 | 11 | 10 | 10 | 1 | 01 | 01 |
| 6x6 | 1-bit K | 3x3 | 2-bit CMY | 11 | 11 | 10 | 10 | 1 | 01 | 10 |
| 6x6 | 1-bit K | 6x6 | 1-bit CMY | 11 | 11 | 11 | 11 | 1 | 01 | 01 |
| 3x3 | 2-bit K | 6x6 | 1-bit CMY | 10 | 10 | 11 | 11 | 1 | 10 | 01 |
| 6x3 | 1-bit K | 3x1.5 | 1-bit CMY | 11 | 11 | 10 | 10 | 1 | 01 | 01 |
| 6x3 | 1-bit K | - | - | 11 | 11 | 00 | 00 | 1 | 01 | - |

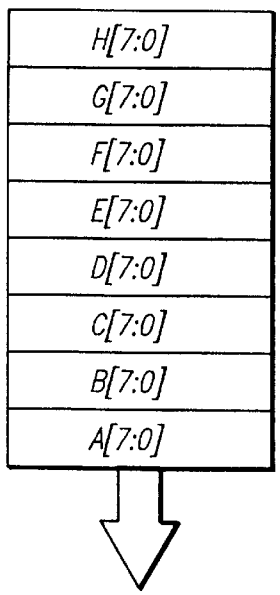
A SINGLE ROW OF INPUT
DATA FOR ONE CHANNEL
FIG. 22
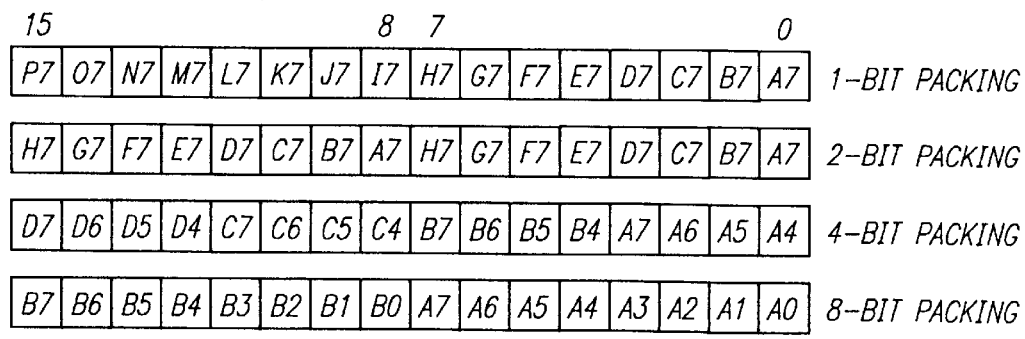
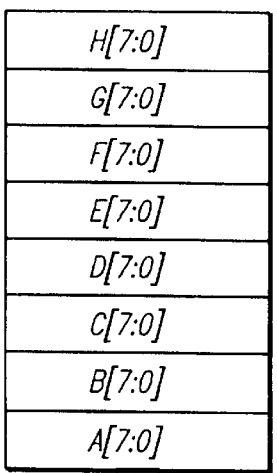
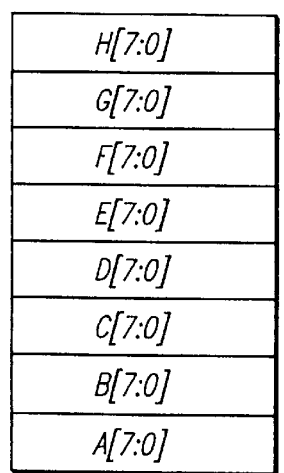
FIG. 23
TWO ROWS OF INPUT DATA
FOR ONE CHANNEL
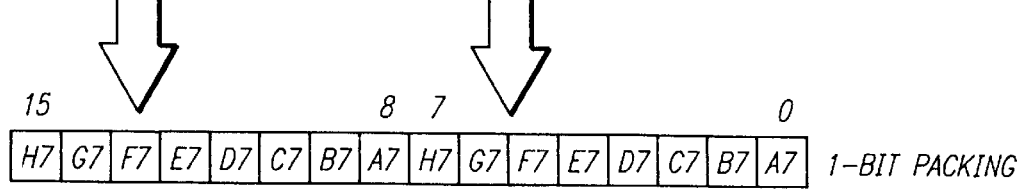

| 8-bit Black 3x3 (skeweddata=0) | | | |
|---|---|---|---|
| Addr | Data | Row | Col |
| 0 | K | 0 | 0-1 |
| 1 | K | 2 | 0-1 |
| 2 | K | 4 | 0-1 |
| 3 | K | 6 | 0-1 |
| 4 | K | 0 | 2-3 |
| 5 | K | 2 | 2-3 |
| 6 | K | 4 | 2-3 |
| 7 | K | 6 | 2-3 |
| 8 | K | 0 | 4-5 |
| 9 | K | 2 | 4-5 |
| 10 | K | 4 | 4-5 |
| 11 | K | 6 | 4-5 |
| 12 | K | 0 | 6-7 |
| 13 | K | 2 | 6-7 |
| 14 | K | 4 | 6-7 |
| 15 | K | 6 | 6-7 |
| . | . | . | . |
| . | . | . | . |
| . | . | . | . |

Table 2. 8 Bit Black (3x3)

| 4-bit Black 3x3 (skeweddata=0) | | | |
|---|---|---|---|
| Addr | Data | Row | Col |
| 0 | K | 0 | 0-3 |
| 1 | K | 2 | 0-3 |
| 2 | K | 4 | 0-3 |
| 3 | K | 6 | 0-3 |
| 4 | K | 0 | 4-7 |
| 5 | K | 2 | 4-7 |
| 6 | K | 4 | 4-7 |
| 7 | K | 6 | 4-7 |
| 8 | K | 0 | 8-11 |
| 9 | K | 2 | 8-11 |
| 10 | K | 4 | 8-11 |
| 11 | K | 6 | 8-11 |
| 12 | K | 0 | 12-15 |
| 13 | K | 2 | 12-15 |
| 14 | K | 4 | 12-15 |
| 15 | K | 6 | 12-15 |
| . | . | . | . |
| . | . | . | . |
| . | . | . | . |

Table 3. 4 Bit Black (3x3)

| 2-bit Black 3x3 (skeweddata=1) | | | |
|---|---|---|---|
| Addr | Data | Row | Col |
| 0 | K | 0 | 0-7 |
| 1 | K | 2 | 0-7 |
| 2 | K | 4 | 0-7 |
| 3 | K | 6 | 0-7 |
| 4 | K | 0 | 8-15 |
| 5 | K | 2 | 8-15 |
| 6 | K | 4 | 8-15 |
| 7 | K | 6 | 8-15 |
| 8 | K | 0 | 16-23 |
| 9 | K | 2 | 16-23 |
| 10 | K | 4 | 16-23 |
| 11 | K | 6 | 16-23 |
| 12 | K | 0 | 24-31 |
| 13 | K | 2 | 24-31 |
| 14 | K | 4 | 24-31 |
| 15 | K | 6 | 24-31 |
| . | . | . | . |
| . | . | . | . |
| . | . | . | . |

Table 4. 2 Bit Black (3x3)

FIG. 24

| 1-bit Black 3x3 (skeweddata=1) | | | |
|---|---|---|---|
| Addr | Data | Row | Col |
| 0 | K | 0 | 0-15 |
| 1 | K | 2 | 0-15 |
| 2 | K | 4 | 0-15 |
| 3 | K | 6 | 0-15 |
| 4 | K | 0 | 16-31 |
| 5 | K | 2 | 16-31 |
| 6 | K | 4 | 16-31 |
| 7 | K | 6 | 16-31 |
| 8 | K | 0 | 32-47 |
| 9 | K | 2 | 32-47 |
| 10 | K | 4 | 32-47 |
| 11 | K | 6 | 32-47 |
| 12 | K | 0 | 48-63 |
| 13 | K | 2 | 48-63 |
| 14 | K | 4 | 48-63 |
| 15 | K | 6 | 48-63 |
| . | . | . | . |
| . | . | . | . |
| . | . | .+ | . |

Table 5. 1 Bit Black (3x3)

| 1-bit Black 6x6 (skeweddata=1) | | | |
|---|---|---|---|
| Addr | Data | Row | Col |
| 0 | K | 0-1 | 0-7 |
| 1 | K | 2-3 | 0-7 |
| 2 | K | 4-5 | 0-7 |
| 3 | K | 6-7 | 0-7 |
| 4 | K | 0-1 | 8-15 |
| 5 | K | 2-3 | 8-15 |
| 6 | K | 4-5 | 8-15 |
| 7 | K | 6-7 | 8-15 |
| 8 | K | 0-1 | 16-23 |
| 9 | K | 2-3 | 16-23 |
| 10 | K | 4-5 | 16-23 |
| 11 | K | 6-7 | 16-23 |
| 12 | K | 0-1 | 24-31 |
| 13 | K | 2-3 | 24-31 |
| 14 | K | 4-5 | 24-31 |
| 15 | K | 6-7 | 24-31 |
| . | . | . | . |
| . | . | . | . |
| . | . | . | . |

Table 6. 1 Bit Black (6x6)

| 1-bit Black 6x3 (skeweddata=1) | | | |
|---|---|---|---|
| Addr | Data | Row | Col |
| 0 | K | 0-1 | 0-7 |
| 1 | K | 2-3 | 0-7 |
| 2 | K | 4-5 | 0-7 |
| 3 | K | 6-7 | 0-7 |
| 4 | K | 0-1 | 8-15 |
| 5 | K | 2-3 | 8-15 |
| 6 | K | 4-5 | 8-15 |
| 7 | K | 6-7 | 8-15 |
| 8 | K | 0-1 | 16-23 |
| 9 | K | 2-3 | 16-23 |
| 10 | K | 4-5 | 16-23 |
| 11 | K | 6-7 | 16-23 |
| 12 | K | 0-1 | 24-31 |
| 13 | K | 2-3 | 24-31 |
| 14 | K | 4-5 | 24-31 |
| 15 | K | 6-7 | 24-31 |
| . | . | . | . |
| . | . | . | . |
| . | . | . | . |

Table 7. 1 Bit Black (6x3)

FIG. 25

| 8-bit Color 3x3 (skeweddata=0) | | | |
|---|---|---|---|
| Addr | Data | Row | Col |
| 0 | C | 0 | 0-1 |
| 1 | M | 0 | 0-1 |
| 2 | Y | 0 | 0-1 |
| 3 | C | 2 | 0-1 |
| 4 | M | 2 | 0-1 |
| 5 | Y | 2 | 0-1 |
| 6 | C | 4 | 0-1 |
| 7 | M | 4 | 0-1 |
| 8 | Y | 4 | 0-1 |
| 9 | C | 6 | 0-1 |
| 10 | M | 6 | 0-1 |
| 11 | Y | 6 | 0-1 |
| 12 | C | 0 | 2-3 |
| 13 | M | 0 | 2-3 |
| 14 | Y | 0 | 2-3 |
| 15 | C | 2 | 2-3 |
| 16 | M | 2 | 2-3 |
| 17 | Y | 2 | 2-3 |
| . | . | . | . |
| . | . | . | . |
| . | . | . | . |

Table 8. 8 Bit Color (3x3)

| 2-bit Color 3x3 (skeweddata=1) | | | |
|---|---|---|---|
| Addr | Data | Row | Col |
| 0 | C | 0 | 0-7 |
| 1 | M | 0 | 0-7 |
| 2 | Y | 0 | 0-7 |
| 3 | C | 2 | 0-7 |
| 4 | M | 2 | 0-7 |
| 5 | Y | 2 | 0-7 |
| 6 | C | 4 | 0-7 |
| 7 | M | 4 | 0-7 |
| 8 | Y | 4 | 0-7 |
| 9 | C | 6 | 0-7 |
| 10 | M | 6 | 0-7 |
| 11 | Y | 6 | 0-7 |
| 12 | C | 0 | 8-15 |
| 13 | M | 0 | 8-15 |
| 14 | Y | 0 | 8-15 |
| 15 | C | 2 | 8-15 |
| 16 | M | 2 | 8-15 |
| 17 | Y | 2 | 8-15 |
| . | . | . | . |
| . | . | . | . |
| . | . | . | . |

Table 9. 2 Bit Color (3x3)

| 1-bit Color 3x3 (skeweddata=1) | | | |
|---|---|---|---|
| Addr | Data | Row | Col |
| 0 | C | 0 | 0-15 |
| 1 | M | 0 | 0-15 |
| 2 | Y | 0 | 0-15 |
| 3 | C | 2 | 0-15 |
| 4 | M | 2 | 0-15 |
| 5 | Y | 2 | 0-15 |
| 6 | C | 4 | 0-15 |
| 7 | M | 4 | 0-15 |
| 8 | Y | 4 | 0-15 |
| 9 | C | 6 | 0-15 |
| 10 | M | 6 | 0-15 |
| 11 | Y | 6 | 0-15 |
| 12 | C | 0 | 16-31 |
| 13 | M | 0 | 16-31 |
| 14 | Y | 0 | 16-31 |
| 15 | C | 2 | 16-31 |
| 16 | M | 2 | 16-31 |
| 17 | Y | 2 | 16-31 |
| . | . | . | . |
| . | . | . | . |
| . | . | . | . |

Table 10. 1 Bit Color (3x3)

| 1-bit Color 6x6 (skeweddata=1) | | | |
|---|---|---|---|
| Addr | Data | Row | Col |
| 0 | C | 0-1 | 0-7 |
| 1 | M | 0-1 | 0-7 |
| 2 | Y | 0-1 | 0-7 |
| 3 | C | 2-3 | 0-7 |
| 4 | M | 2-3 | 0-7 |
| 5 | Y | 2-3 | 0-7 |
| 6 | C | 4-5 | 0-7 |
| 7 | M | 4-5 | 0-7 |
| 8 | Y | 4-5 | 0-7 |
| 9 | C | 6-7 | 0-7 |
| 10 | M | 6-7 | 0-7 |
| 11 | Y | 6-7 | 0-7 |
| 12 | C | 0-1 | 8-15 |
| 13 | M | 0-1 | 8-15 |
| 14 | Y | 0-1 | 8-15 |
| 15 | C | 2-3 | 8-15 |
| 16 | M | 2-3 | 8-15 |
| 17 | Y | 2-3 | 8-15 |
| . | . | . | . |

Table 11. 1 Bit Color (6x6)

| 1-bit Color 3x1.5 (skeweddata=1) | | | |
|---|---|---|---|
| Addr | Data | Row | Col |
| 0 | C | 0 | 0-15 |
| 1 | M | 0 | 0-15 |
| 2 | Y | 0 | 0-15 |
| 3 | C | 2 | 0-15 |
| 4 | M | 2 | 0-15 |
| 5 | Y | 2 | 0-15 |
| 6 | C | 4 | 0-15 |
| 7 | M | 4 | 0-15 |
| 8 | Y | 4 | 0-15 |
| 9 | C | 6 | 0-15 |
| 10 | M | 6 | 0-15 |
| 11 | Y | 6 | 0-15 |
| 12 | C | 0 | 16-31 |
| 13 | M | 0 | 16-31 |
| 14 | Y | 0 | 16-31 |
| 15 | C | 2 | 16-31 |
| 16 | M | 2 | 16-31 |
| 17 | Y | 2 | 16-31 |
| . | . | . | . |

Table 12. 1 Bit Color (3x1.5)

| Bit Descriptions | | | |
|---|---|---|---|
| Register | Bit Name | Reset Value | Functional Description |
| BitPackBlkAddr0Wr BitPackBlkAddr1Wr | addr[19:0] | 0 | The starting address for the black DMA channel. The hardware will increment this address whenever black channel DMA occurs. |
| BitPackClrAddr0Wr BitPackClrAddr1Wr | addr[19:0] | 0 | The starting address for the color DMA channel. The hardware will increment this address whenever color channel DMA occurs. |
| BitPackCntrl0Wr | blackevenrowen | 0 | Enable for black data on even rows. If this bit is not set any data incoming on rows 0, 2, 4, or 6 will be discarded. |

FIG. 28a

| Bit Descriptions | | | |
|---|---|---|---|
| Register | Bit Name | Reset Value | Functional Description |
| | blackoddrowen | 0 | Enable for black data on odd rows. If this bit is not set any data incoming on rows 1, 3, 5, or 7 will be discarded. Since the odd rows are not used when in 4-row mode, this bit is only applicable when eightrowmode is set. |
| | blackevencolen | 0 | Enable for black data on even columns. If this bit is not set any data incoming on columns 0, 2, 4, 6 ... will be discarded. |
| | blackoddcolen | 0 | Enable for black data on odd columns. If this bit is not set any data incoming on columns 1, 3, 5, 7 ... will be discarded. |
| | colorevenrowen | 0 | Enable for color data on even rows. If this bit is not set any data incoming on rows 0, 2, 4, or 6 will be discarded. |
| | coloroddrowen | 0 | Enable for color data on odd rows. If this bit is not set any data incoming on rows 1, 3, 5, or 7 will be discarded. Since the odd rows are not used when in 4-row mode, this bit is only applicable when eightrowmode is set. |
| | colorevencolen | 0 | Enable for color data on even columns. If this bit is not set any data incoming on columns 0, 2, 4, 6 ... will be discarded. |
| | coloroddcolen | 0 | Enable for color data on odd columns. If this bit is not set any data incoming on columns 1, 3, 5, 7 ... will be discarded. |
| | eightrowmode | 0 | If the data input to bitpack (from error diffusion) contains eight rows of image data, this bit should be set. Otherwise, four rows of input data is assumed. In this case the data is on the even rows and the odd rows are not used. |
| | blackmode[1:0] | 0 | These bits selects one of the four output resolutions available for the black data channel:<br>00 : 8-bits per pixel<br>11 : 4-bits per pixel<br>10 : 2-bits per pixel<br>01 : 1-bit per pixel |
| | colormode[1:0] | 0 | Same as above, except for the color channels |
| | skeweddata | 0 | If the data input to bitpack has been skewed there are 6 (4-row mode) or 28 (8-row mode) pixels added to the start of the image that do not contain valid data. Setting this bit prevents these pixels from being DMAed to memory. |
| | endofrowen | 0 | This bit performs the same operation as skeweddata except at the end of the image rows. When it is set, bitpack will use the end-of-row signal from error diffusion to stop DMA for a row. If a shift register is partially full when the end-of-row signal is received it will be completed with zeros before being DMAed out. The setstartup control bit must be used to restart the sift registers after they have received an end-of-row signal. |

FIG. 28b

| Bit Descriptions | | | |
|---|---|---|---|
| Register | Bit Name | Reset Value | Functional Description |
| BitPackCntrl1Wr | setstartup | NA | This bit clears the shift registers and initializes the internal row and column counters. It must be used to restart after changing any of the configuration registers or to restart after an end-of-row condition has stopped the DMA. |
| | purgeblk | NA Error! Bookmark not defined. | This bit clears the black DMA FIFO. |
| | purgeclr | NA Error! Bookmark not defined. | This bit clears the color DMA FIFO. |
| BitPackRd | blkfifofull[3:0] | 0 | The current status (1=full) of each segment in the black DMA FIFO. |
| | clrfifofull[3:0] | 0 | The current status (1=full) of each segment in the color DMA FIFO. |
| | endoflastrow | 0 | Indicates that an end-of-row signal has been received on the last row (4$^{th}$ for 300dpi, 8$^{th}$ for 600dpi). |
| | blkdmaactive | 0 | This bit is set from the time the black DMA channel has requests an access until the DMA has finished. |
| | clrdmaactive | 0 | This bit is set from the time the color DMA channel has requests an access until the DMA has finished. |

FIG. 28c

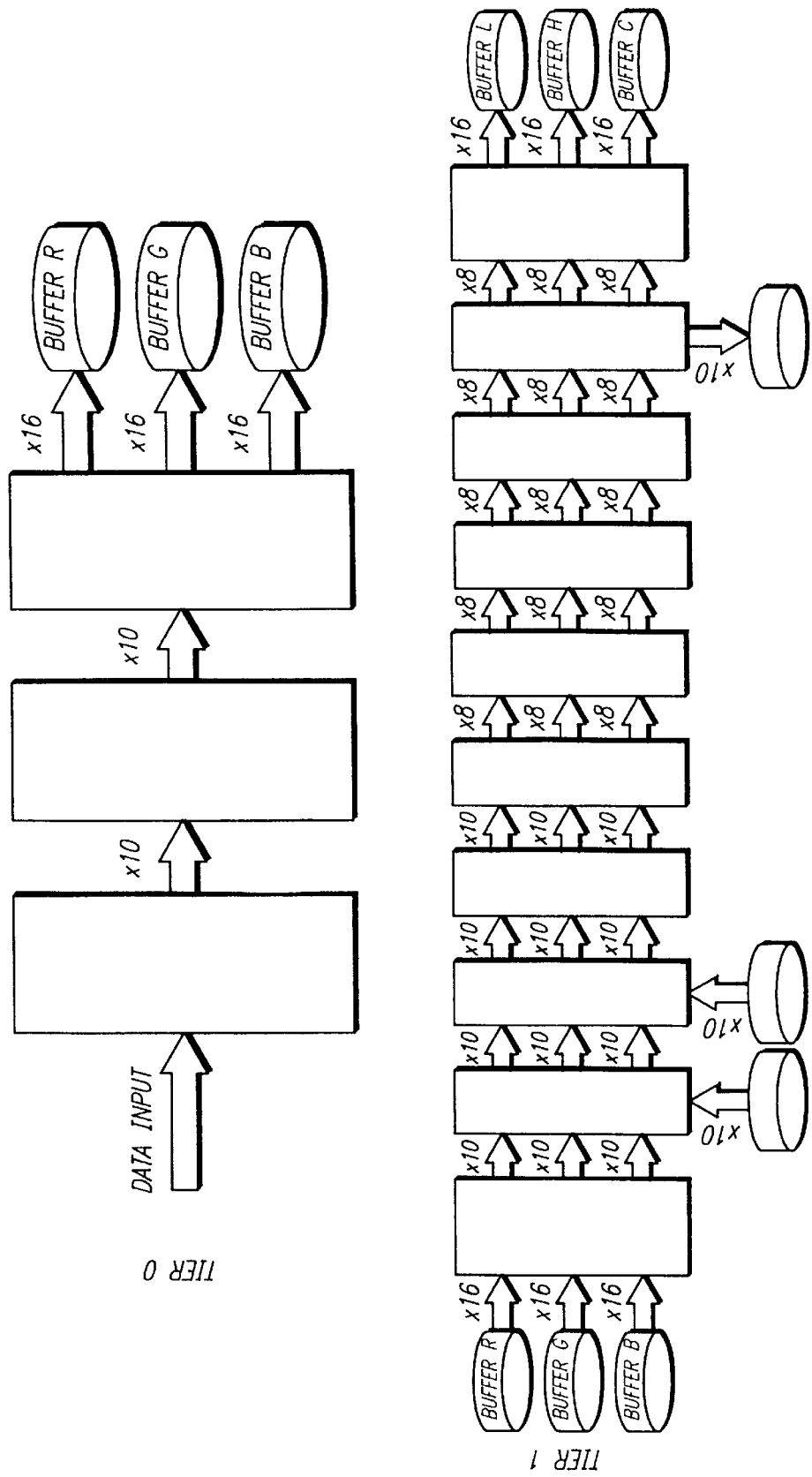

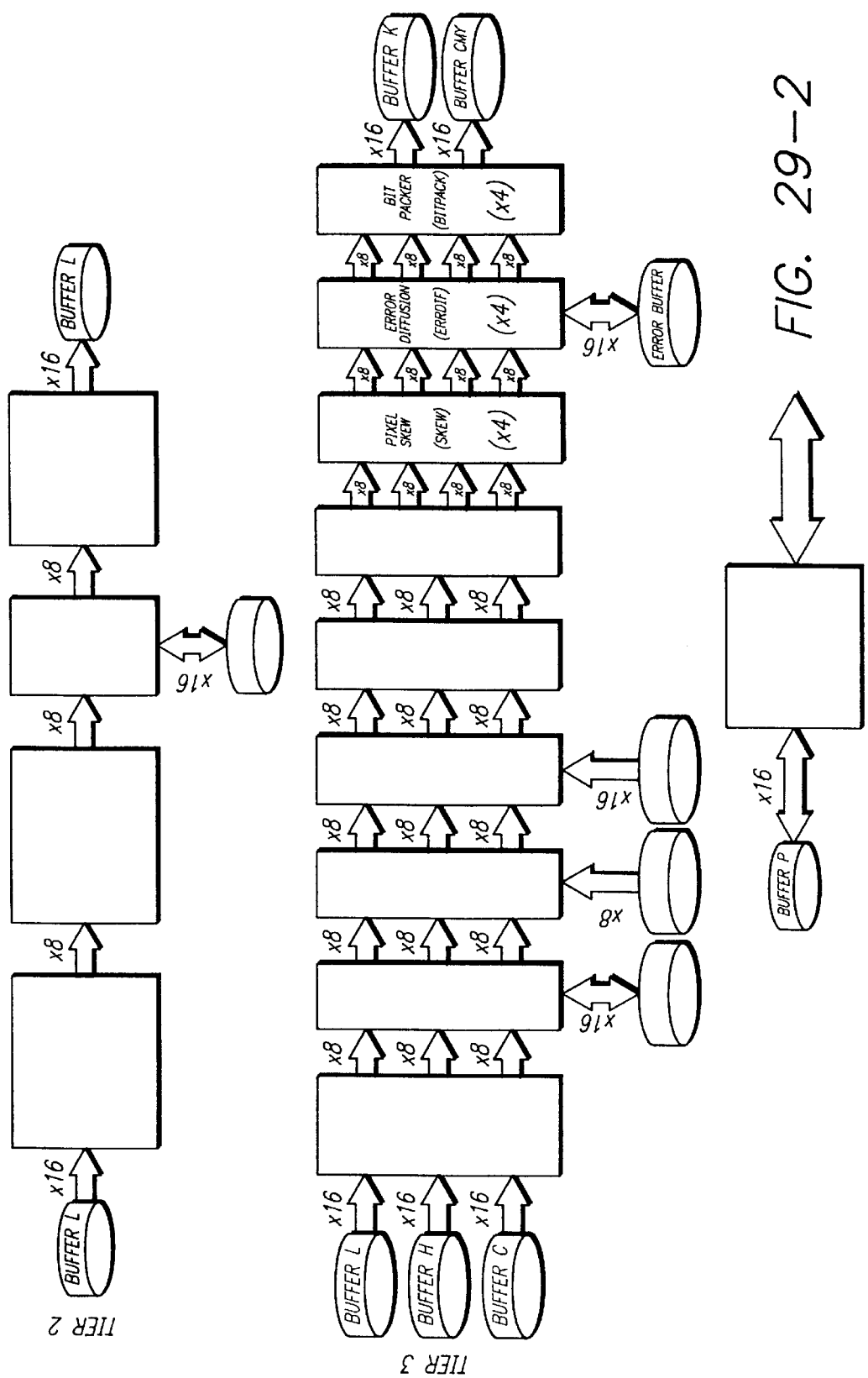

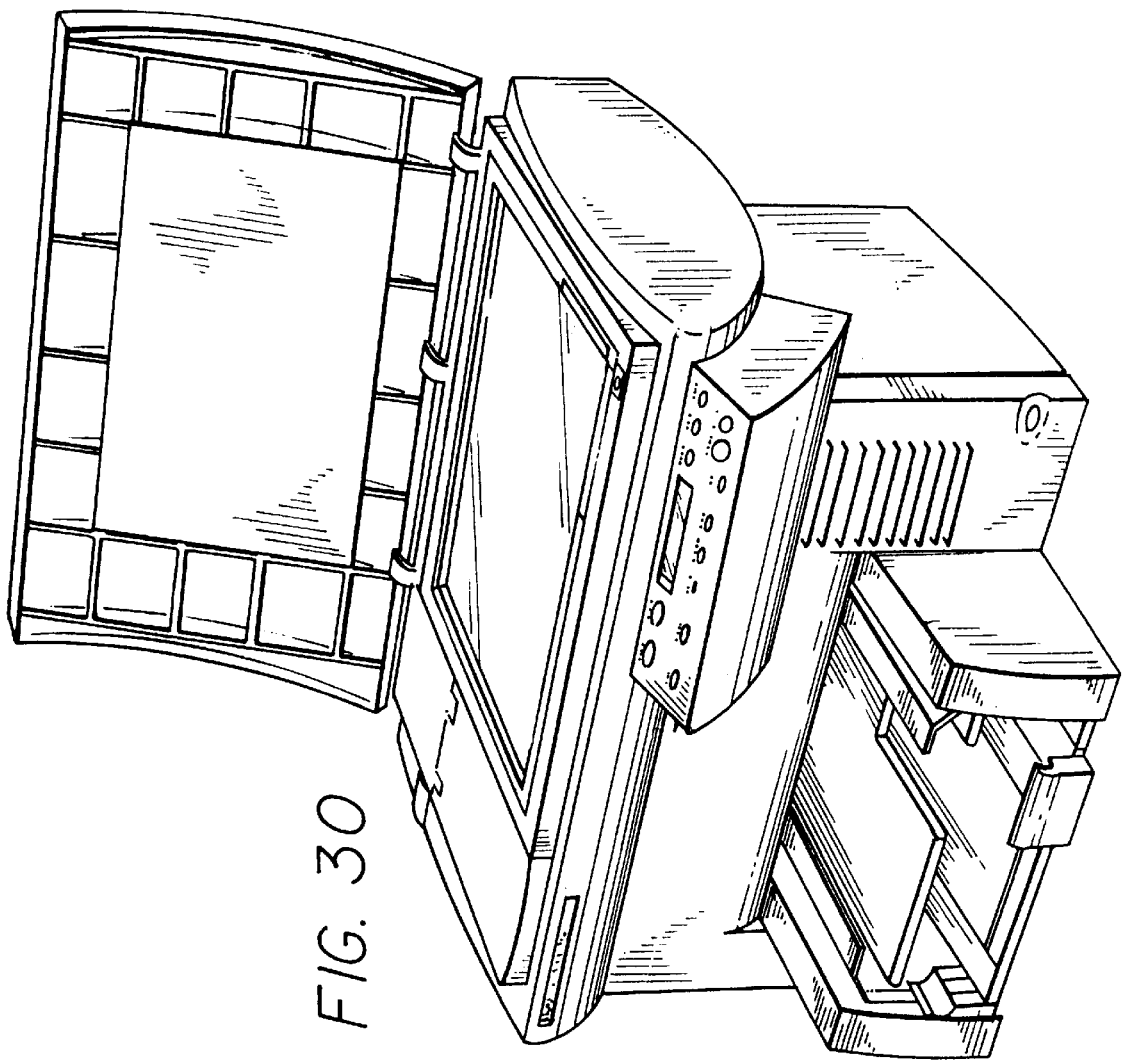

5,974,228

IMAGE RENDITION BY PLURAL-ROW ERROR DIFFUSION, FOR FASTER OPERATION AND SMALLER INTEGRATED CIRCUITS

RELATED PATENT DOCUMENTS

A related document is coowned U.S. Pat. No. 5,333,243, entitled "METHOD FOR FORMING COLOR IMAGES, USING A HUE-PLUS-GRAY COLOR MODEL" and issued in the names of Best and Dillinger. It deals with novel forms of error diffusion (in which the color to be printed at each pixel is restricted to one of the active colorants for that pixel, and/or diffusion calculations are performed in the hue-plus-gray color space), and it is hereby incorporated by reference in its entirety into this document.

FIELD OF THE INVENTION

This invention relates generally to machines and procedures for printing text or graphics on printing media such as paper, transparency stock, or other glossy media; and more particularly to system and methods for performing certain kinds of rendition procedures known as "error diffusion", in preparation for printing.

Error diffusion is favored for handling photograph-like images (e. g., continuous-tone or near-continuous-tone pictorial images) in thermal-inkjet printing and in printing by other devices which construct images as arrays of dots in pixel rows. The invention is used in, and may encompass, an image-related device such as a printer or a copier—or a multipurpose machine that can be used for printing or copying.

BACKGROUND OF THE INVENTION a. Rendition processes of various kinds are widely practiced. Their purpose is as follows.

Typical current-day input images to be printed are sometimes represented by data for three additive primary color lights, typically red, green and blue; and sometimes instead for three or four subtractive primary colorants, typically cyan, magenta, yellow and black; and sometimes for other color spaces, including for example the Dillinger hue-plus-gray or hnk system originating at the Hewlett Packard Company. In all such cases most typically the data are stated for multiple, typically 255, visual levels.

Such high-bandwidth input is impossible to reproduce dot for dot, or pixel for pixel, with a low-bandwidth printing machine. By this I mean any machine that operates in binary color—or even in multilevel color but with only relatively few levels (e. g. a maximum of a few dots) per pixel.

A process that deals with this problem is called "rendition". In general, rendition forces the average color of at least several printed pixels to approximate the originally desired input colors averaged over a roughly corresponding group of positions.

Rendition includes so-called "dithering" methods, generally used for graphics such as broad fields of solid color, and "error diffusion"—which as mentioned above ordinarily provides better results for photograph-like images.

b. Error diffusion is a familiar conventional rendition process generally attributed to Floyd and Steinberg, but modified by many other workers for application to color images. In printing or copying machines of the type under consideration, heretofore the universal way of implementing Floyd-Steinberg error diffusion is to process one row 10 (FIG. 1) at a time, starting at one side of the image pixel-data array 21 and moving 22 along that row—dealing with each generalized pixel 11 in turn—to the other side.

After processing of each row 10 is complete, the next row below is taken up in a like manner. Accordingly the overall processing propagates row-wise downward 23.

In this procedure, as is well known to those skilled in the art, each pixel 11 starts out with its initial color values established in a data file or otherwise, as for instance by acquisition in real time from a scanner. (The term "values" here merely means numbers, as distinguished from the "value" parameter used in some color spaces.) For example each pixel may have three, four or five associated values, one for each color or calorimetric parameter employed by the particular system that is in use.

To these values in each pixel 11 will be added—unless the pixel is in the top row of the image—so-called "errors" for the same colors respectively, generated by certain previously processed nearby pixels 12–15 (FIG. 2). Most usually the number of such earlier-processed contributors is four, but some systems operate using more, or fewer—even one.

These additions from the nearby pixels 12–15 are summed into separate memories for the various colors, for the pixel 11 of interest during (in systems of which I am aware) the times when the system is processing those earlier pixels. It is particularly important to note that, while an earlier pixel 12 is being processed, the system reaches forward in the image data array to place errors for the various colors into memory cells for a pixel 11 that will be processed later; and similarly for the other earlier pixels 13–15.

For each pixel 11 of interest, error values are thus received from several (four, in the drawings) specific previously processed pixels 12–15 in turn, as those particular pixels are taken up for processing. This leads to an accumulated error sum, for each color, which is completed only during processing of the last of those earlier pixels to be processed—i. e., the pixel 15 which is immediately upstream (to the left, in the drawing) in the processing sequence, along the same row 10.

Now when it is time for the pixel 11 of interest to be processed, this accumulated error sum is added into the original input image values (typically much larger), and then the grand total is evaluated. If the sum exceeds one or more of certain programed thresholds, the system prints a dot (or in some cases plural dots, or no dot) of a particular color in the current pixel. That dot has a specific color shade, and corresponding value (again, simply a number).

The difference between the accumulated input sum and the color value of the actual printed dot is denominated the "whole error". This "whole error" is next divided among neighboring pixels 16–19 (FIG. 3) which have not yet been processed. Analogous distributions, as will be understood, were the origins of the errors inherited by each pixel 11 from previously processed pixels 12–15 as mentioned above.

The number of destination pixels 16–19, into which error is distributed, typically equals the number of previously mentioned pixels 12–15 from which error is distributed (i. e., again, most usually four). For each particular one of the target pixels 16–19, the "whole error" is multiplied by a respective fraction and then truncated to the next smaller integer, which is then added into that particular one of the target pixels 16–19.

In such a process, error values propagate through the data array in a manner reminiscent of fluid diffusion through a permeable medium—whence the term "error diffusion".

Fractions are commonly selected that add up to roughly unity, so that the error flow neither blows up nor damps out.

By setting thresholds and maximum-print levels, the designer or user can program the output to have—for example—two, three or four levels.

In at least some prior software, and for purposes of the present document including the claims, a particular pixel 11 being processed is called the "current pixel". By the phrase "being processed" I mean at least the operation of distributing error out to other pixels. The four neighbors into which error is distributed are called the "next pixel" 16, "left pixel" 17, "center pixel" 18 and the "right pixel" 19.

The first-mentioned of these, the "next pixel", is traditionally "next" in two different senses: it is immediately adjacent to the current pixel, and it is also the next to be processed—after the current pixel. (As will be seen, I retain this historical nomenclature even though in accordance with my invention the meaning in one of these senses is not applicable.)

The second of these meanings is related very closely to the order of processing, namely along the row 10 longitudinally and—from the earliest convention—in the direction 22 left to right. As the shading (FIGS. 2 and 3) suggests, processing actually progresses along a path through a series of "next pixels", each "current pixel" being the final contributor to its "next pixel".

As soon as that final contribution to a "next pixel" is made, that "next pixel" has received all the error contributions it will ever receive—so a natural next step is to process that "next pixel" as the succeeding "current pixel". In other words, from an opposite perspective: to implement a strategy of longitudinal processing along each row 10 in turn, in a natural manner, advantageously the final error distribution into each pixel should be made at a time when that pixel is a "next pixel". This process, of distributing into the next pixel last, runs right into the processes of print decision for that pixel and then distribution of remaining error from that pixel.

When that next pixel thus becomes the current pixel, it similarly distributes error into the new left, center and right pixels 17–19 (FIG. 3) and into the new next pixel 16. The shading suggesting the path 22 of processing is accordingly extended by one pixel rightward along the row 10, in a succession of natural steps.

Row-wise longitudinal processing certainly qualifies as conventional wisdom, for it arises in an extremely pervasive fashion: it is the manner in which data are generated by a row scanner (by far the best known and most common type) and the manner in which data are queued for display (from the earliest video), and also the manner in which data are most commonly stored and transfered.

For two reasons, however, left-to-right processing is not at all exclusive. First, it is arbitrary: an image pixel grid (though of course not the image information itself) is perfectly symmetrical, and the data are therefore amenable to perusal and processing in either direction. Second, even within an established processing algorithm or apparatus it is known to analyze the data along a processing path that is left-to-right sometimes and right-to-left at other times.

Indeed alternation between the two directions, as for instance in a serpentine path that reverses direction in every other row, reduces directional-pattern artifacts in certain types of error diffusion. Such bidirectional processing is therefore popular for error diffusion in some schools of thought.

Therefore for purposes of this document it will be understood that the "next pixel" is not always to the right of the current pixel. Rather it is in the same row, and adjacent, and in a certain sense along a direction of processing. (That sense, however, as will be seen later does not necessarily mean along a row which is being processed.)

Analogously the designations "right pixel" and "left pixel" are not to be limited to their literal meanings. Rather they are hereby defined as pixels disposed relative to the current pixel downward and, respectively, in and opposite to a direction of processing (where once again the "direction of processing" does not necessarily mean along a row which is being processed).

Because error diffusion is inherently progressive, and therefore to a necessarily large extent directional, the occurrence of directionality artifacts has always posed problems. A major line of development in this field is the introduction of techniques for breaking up or concealing directionality.

In addition to the use of serpentine paths an important technique is introduction of randomness into the processing. Random sequencing, random weights, random spatial distribution of the error, and numerous other methods are extensively discussed in the patent and other literature. It is important that any new overall strategy for implementing error diffusion be compatible with at least some such randomization techniques.

Understanding of these and many other sophisticated enhancements of error diffusion is beyond the scope of this document, as those theoretical analyses—while in general compatible with my invention—are not at all necessary to understanding or practice of my invention. For further details on those advanced theories I therefore refer the reader to the literature, an excellent starting point being Ulichney, *Digital Halftoning* (MIT 1987, 1993).

c. Conventional software implementations of error diffusion, as mentioned above, call for processing one row 10 at a time, from one side of the image to the other. Such processing is commonly performed by a printer driver (software) in a host computer.

In this environment the number of memory cells, both short- and longterm memory—and also the amount of hardware available for the desired computations—is ordinarily ample for the tasks at hand. We need not discuss such considerations as conserving memory of various types, or the cost of computing-hardware elements needed to perform the work.

The absolute speed of error-diffusion processing in this environment of course varies with the performance of the host computer. Considered instead in terms of relative speed or efficiency, this type of image rendition—in comparison with, for example, dither methods of rendition—by the general-purpose host CPU is relatively very slow.

Consumer demand for higher throughput in economical printers, copiers etc. continues to rise, and the market-place for these machines intensely competitive. Therefore it is very undesirable to be limited by the speed of a host computer.

This is a particularly serious matter for manufacturers and vendors of printers and copiers, since it interferes with ability to advertise a particular throughput—without having to hedge as to the unknown speed of the host. Therefore it is extremely desirable to increase overall printing or copying throughput in inexpensive image-related devices, and also to isolate this performance to a certain extent from that of a computer to be obtained and connected by the customer.

In thus increasing throughput, however, it is crucial to refrain from running up the price of the printer or copier unduly, since this would degrade the overall competitive position of the product in the market. These considerations are particularly aggravated by the fact that four-pixel error-diffusion itself, as already indicated, is notoriously slow.

Its slowness is due partly to performing a significant amount of arithmetic for each pixel—but this is accomplished rather quickly using internal registers of the system central processor. Of equal or greater interest for present purposes is the time required for reading information from relatively longterm memory, and also for storage, as such, of the results of calculation—back into the relatively longterm memory.

I refer to time taken up directly by the electronic processes involved in copying or shifting each of the several error-data values into several pixels other than the one being processed. There are three main types of transactions of the sort here under discussion: reading image data from a source device (e. g., scanner etc.) or more commonly some sort of input storage, reading error data from earlier-processed pixels 12–15, and writing (summing) error data into later-to-be-processed pixels 16–19. Image processing in general, whether by software or hardware, tends to require ample data storage and correspondingly large numbers of storage transactions.

d. Substitution of hardware/firmware—It is known, in general, to replace a software module with dedicated hardware, fabricated with instructions for data processing. Indeed this has been done for error diffusion—first in so-called "firmware", usually a read-only memory (ROM) integrated circuit feeding the instructions to a microprocessor; and later in an application-specific integrated circuit (ASIC) that not only has the instructions but also obeys them. Possibly such hardware implementations might instead be carried out in, merely by way of example, a field-programmable gate array (FPGA), or a programmable logic array (PLA).

Any of such devices when manufactured with a suitable program can typically achieve higher speed than corresponding or analogous software running in a general-purpose computer. Such a speed improvement may be accomplished in part simply through design of the circuit particularly for a given task—but speed may be enhanced also through various specific strategies.

One such known strategy, for example, is direct memory access (DMA), which moves data to and from external, intermediate storage devices such as dynamic random-access memory (DRAM) directly on command. In this type of data access it is not necessary to wait for a processor to receive and process instructions from an applications program to make a data transfer—which instructions sometimes in turn may entail still other steps required by an operating system (such as testing the propriety of the data transfer, or determining the best way of accomplishing it).

Another strategy available in custom hardware is performance of many tasks (including to an extent certain types of data transfer) simultaneously. Thus, implementing error diffusion in hardware starts out with some weighty advantages.

Modernly it is known to provide relatively large dedicated hardware/firmware modules that control numerous functions in a printer, copier or multifunction machine. This too may be deemed an advantage, since it facilitates sharing the cost of some hardware and this may confer a price advantage on the error-diffusion part of the overall module.

A straightforward hardware implementation of error-diffusion sequencing will now be analyzed in detail, particularly to facilitate later comparison with the methods of my invention. Here the focus, unlike that in analyzing software implementation, necessarily includes careful attention to the use of all the hardware resources.

In single-row longitudinal processing, a typical sequence may be as follows, given a representative series of three rows of pixels diagramed thus—

| 1 | 2 | 3 | 4 | 5 | 6 | 7 | 8 |
|---|---|---|---|---|---|---|---|
| a | b | C | d | e | f | g | h |
| m | n | o | p | q | r | s | t. |

We take up the sequence as the processing reaches current pixel C. (Another conceptualization of the flow of error data into DRAM for later analysis, and into flipflops or other storage for use in the actual printing process, appears in FIG. 4.)

Original image data for that pixel C were initially placed in DRAM cells for that pixel, and later read from DRAM into internal memory—not in the part of the hardware that performs error-diffusion calculations, but rather in one of its earlier blocks which performs preliminary processes such as color correction or adjustment, filtering or the like. Pixels are handed down from all such earlier blocks sequentially via internal registers to the error-diffusion modules.

Error from pixels 2, 3 and 4 has subsequently been summed into registers (for the several colors) for that same pixel C. Error was first distributed into pixel C at a time when pixel 2 was the current pixel and pixel C was the right pixel. Additional error later was similarly distributed into pixel C from pixel 3 (when C was the center pixel), and then still later from pixel 4 (when C was the left pixel).

At that last-mentioned point the sum of these three distributions into the pixel-C registers was stored into DRAM cells temporarily assigned to that pixel, releasing the working registers for other use. At this point the initial image value too, in purest principle, could have been summed into the DRAM cells—but this step, in consideration of the greater number of bits reserved for each image value and therefore the register sizes that must be carried along thereafter, is advantageously deferred until pixel-C processing time.

The memory transactions for all such distributions will be made more clear momentarily. They occurred during processing of "current pixels" in the row above pixel C, typically two or three thousand pixels earlier than the processing of pixel C.

Moreover, much more recently, error from pixel b has just been stored (or possibly just retained, as will be seen) in new temporary working registers for pixel C. That occurred when pixel C was the next pixel—during processing of pixel b as the current pixel.

Now to open processing of C as the current pixel, the sum of its previously accumulated error contributions is fetched from its DRAM cells and summed into the just-mentioned temporary pixel-C working registers. Also preferably added in at this point, though not necessarily into the selfsame registers, is the initial image value for the pixel.

That value is most typically handed down at this moment from an upstream processing block in the ASIC. The resulting new sum is compared with the system threshold or thresholds that have been worked out, for the number of levels to be printed, generally as in FIG. 5.

The printing decision is thereby made and stored or implemented as in FIGS. 4 and 5—leaving for pixel C, after subtraction of the print value, a residual or error value. That pixel-C "whole error" is multiplied by the planned weights, and its resulting fractional parts stored into respective working registers for the right pixel p, and also center pixel o (where it is summed into a previously stored right-pixel error component from pixel b).

The fractional part for left pixel n, however, is added to contributions into that pixel from pixels a and b (kept in temporary pixel-n working registers for the purpose), and the sum transfered to DRAM cells for pixel n. The pixel-n registers just mentioned were first opened when pixel n was the right pixel, for pixel a. The right-pixel error from pixel a, stored in the pixel-n registers, was then incremented, when pixel n was the center pixel, by the amount of the center-pixel error from pixel b.

DRAM storage, rather than registers, is used for the now-accumulated error for pixel n—when it is the left pixel, because this is the final contribution from the current row for pixel n. This pixel will not be taken up again until the system is working in the row "mnopqrst", at the time when pixel n is the next pixel for then-current pixel m.

If instead the left-pixel error were kept in registers for pixel n, this would imply that the same treatment would be appropriate for pixels o, p, q etc.—i. e. for virtually all the pixels in each row. This would require provision of an undesirably very high number of registers, equal (for each color) to the number of pixels in a row.

The rest of the errors in the pixel-C registers are the distributions for the next pixel d, which error fraction may be transfered to pixel-d registers. (Alternatively it is possible to roll over the registers used in processing each current pixel—i. e. to only, in general effect, rename the pixel-C registers as the pixel-d registers. As will be understood, such a simplified description omits many timing and housekeeping considerations.) Also summed into them are the image data and previously accumulated errors retrieved from DRAM for pixel d.

The immediately foregoing discussion of the mechanisms for storage of error from successive current pixels should make clear that error flows first into working registers, for the right and center pixels, and then (as a consolidated transfer of the cumulation) into the left-pixel DRAM cells as those pixels in turn progressively become the left pixel. This analysis thus shows how the previously discussed errors were summed into the pixel-C DRAM cells, too.

(The right- and center-pixel working registers, along with the registers for the several colors of the current pixel, amount to a group of just three working memories per color, for the cluster of pixels in FIG. 4. These preferably are, or can be, in effect rolled over or recycled into corresponding functions for all the other current pixels in the current row and the row just below—and eventually the entire image.)

In current-day systems with which I am involved, each DRAM so-called "fetch" or "store" typically transfers sixteen bits, and data for each color most commonly require only eight bits. Therefore each transaction for a pixel in a four-color system takes two (not one, or four) fetches or stores. The number of fetches or stores thus depends upon the number of colors or other color parameters in the system, and also on whether the sixteen-bit custom just described is being followed in the particular hardware involved. To avoid the resulting confusion, and to generalize the discussions in this document, in passages that require specifying or comparing how many DRAM transactions occur in prior-art systems or in my invention, I shall refer to DRAM retrievals and deposits—which I hereby define for purposes of this document to mean respectively the fetches and stores required to deal with whatever number of colors is present in one generalized pixel. This is not standard terminology, but is adopted in this document because the utility and basic sense of my invention relate most fundamentally to transfer of information per pixel—and do not depend on the system bit or byte architecture, or the number of bits per color, or indeed even the color space in use—i. e., the number of colors or color parameters which are being carried along in the calculations. Further I define a DRAM transaction as a retrieval or deposit.

In summary therefore the system in performing processing of one current pixel:
  (1) performs one retrieval from DRAM—of the errors previously summed due to the roles of that same pixel as right, center and left pixel respectively; and
  (2) performs one deposit into DRAM—of the left-pixel error with previously summed errors for the same (left) pixel in its roles as right and center pixel;
  (3) typically receives and adds in the handed-down original image data; and
  (4) maintains open storage registers for at least the current, next, right, and center pixels.

Thus two DRAM transactions, in different directions and at slightly different moments, are required in processing (e. g., four total fetches or stores, in a sixteen-bit CMYK system) of each pixel as a current pixel.

A straightforward implementation such as just described has certain undesirable characteristics or limitations. Recognition of these undesirable features has required extremely extensive experience and analysis; I therefore consider this recognition to be a part of the inventive contribution which is the subject of this document. Accordingly I shall reserve for the "SUMMARY OF THE DISCLOSURE" section, which follows, introduction of these limitations.

For purposes of definiteness, in this document operation such as just described is called "processing one row at a time" even though some of the error from the row containing the current pixel is distributed into the row below. This operation is also called "processing longitudinally along rows"—even though some of the error flow is generally transverse to the rows.

Directions of error flow are determined by the basic error-diffusion protocol itself; the present invention for the most part retains that protocol and the resulting error-flow directions, and as will be seen focuses on the sequenced selection of "current pixels". Thus the terminologies "one row at a time" and "longitudinally" are hereby defined specifically with reference to the successive selection of "current pixels".

e. Other kinds of processes—In various types of image processing other than error diffusion, strategies for working with several rows at a time are known. Examples are dithering (another kind of image rendition, as mentioned earlier) and filtering.

Each such strategy, however, requires very detailed and intricate implementation tactics which necessarily are extremely specific to the particular process involved. Heretofore to the best of my knowledge it has not been suggested to devise or apply any such plural-row strategy or tactics to error diffusion.

f. Conclusion—As suggested by the foregoing, speed of error-diffusion rendition has continued to impede achievement of excellent color printing of near-continuous-tone or other photograph-like images—in an economical printer or copier, at high throughput. Thus important aspects of the technology used in the field of the invention remain amenable to useful refinement.

SUMMARY OF THE DISCLOSURE

The present invention introduces such refinement. Before presenting a relatively rigorous or formal definition or description of my invention, I shall begin by outlining in an informal or introductory way—which is not to be taken as defining the scope of my invention—some of my above-mentioned observations or recognitions.

As noted above, these include recognition of limitations which afflict a straightforward attempt to implement error diffusion in hardware. Such an approach naturally follows what has been done in software and hardware heretofore—namely processing pixels sequentially along each row 10 of the image data.

a. Hardware considerations—At each pixel 11, besides multiplication and addition steps it is necessary to perform several data transfer operations. In the foregoing section these have been categorized, for the software environment, into three types, and it is noteworthy that these same three kinds of reading and writing (summing) operations persist when implementation is essayed in hardware.

Particularly important among these are the writing/summing of error from each current pixel 11 (FIGS. 1 through 3) into its neighbors 16–19. I focus on these because they do not directly involve initial entry of image data into the overall process; they are only intermediate results, "carries" on the electronic scratchpad so to speak, and therefore need not a priori require use of external memory.

It is particularly noteworthy that, in hardware, memory transactions can be performed using memory devices of respectively different types, speeds and costs—and that taking these factors into account in planning the flow of data and the sequencing of the process can lead to significant differences in overall throughput and cost for the finished device. For instance external memory may be intrinsically slower, or may be effectively slower because of its mode of use—or both.

In conventional row-wise processing, only the distribution to a next pixel 16 occurs within a row that is being processed. As pointed out previously, neighboring pixels in the succeeding row down will not be taken up for processing until typically some thousands of pixels later; hence it would be costly to provide enough internal registers to hold all out-of-row distributions until processing time.

In the context of hardware implementation this may mean, typically, that the error distributions to the out-of-row pixels (i. e., left, center and right pixels 17–19) entail for each recipient pixel at least a consolidated data transfer into external storage as mentioned above. A like transfer is required to retrieve previously stored error, for each pixel.

My invention proceeds from recognition that the traditional, historical patterns of hardware use are actually artificial, and that there are ways to reduce the effective number or duration of such DRAM or like transactions. As previously noted, these transactions occur at least twice for each pixel; multiplied by all the pixels in an image, they aggregate to a very large amount of time.

For understanding of this part of the problem it is helpful to consider the effective duration of a transaction as the time T required for the transaction, divided by the number n of pixels for which that transaction can be effective. (In this statement, it will be noted, the term "effective" appears used in two different senses.) As a special case of this, for example, if a number i of pixels can be made to undergo that transaction simultaneously, then the transaction is "effective" for i pixels, n=i, and the effective duration is T/i seconds (hopefully nanoseconds) per pixel. Other ways of making n greater than one will be introduced shortly.

Perhaps equally important is the fact that the total required time interval is not in sizable separated blocks of time, which might be readily scheduled with respect to necessary processes of other modules within the same hardware. Instead it takes the form of a constant series of demands for individual transactions, continuously impeding access by the other modules.

Most typically in this type of hardware there is only a single data bus serving all the DRAM-access needs of all the modules in common. In engineering vernacular a module whose DRAM transactions form such a continuing sequence "hogs the bus".

b. Processing generally transverse to rows—More pertinent to the present invention are the observations in the foregoing "BACKGROUND" section about the reception of "next pixel" error as the final contribution to each current pixel. As pointed out there, making next-pixel error the final contribution is closely linked with moving on along a horizontal row into the processing of that current pixel.

If instead a different error component is the final contribution, this fact can facilitate moving on along a different path. I have discovered that this relationship can be exploited to provide a significantly faster system for error storage and retrieval.

Such a system entails processing each pixel 111 along an angled or skewed path 120 (FIGS. 6 through 9), downward and from right to left 122 within a group 110 of row rather than along a single row. After reaching the bottom of the skewed path 120, the system starts again at the top of the group 110 in another path 120' (FIG. 9) that is just to the right of the completed one.

Thus the skewed processing path 111 is shifted progressively to the right, so that within the group of rows the processing propagates rightward 123 (FIG. 6)—until the group of rows is entirely processed. Then the next lower group of rows is processed in the same fashion, so that the overall processing propagates downward 124.

It will shortly be seen that use of a path 111 generally transverse to the group of rows 110 facilitates use of storage registers rather than DRAM for all the intermediate error transactions between the top and bottom of the group. Error transactions for pixels at the top and bottom of the group are made with DRAM generally as for each pixel 11 (FIGS. 2 and 3) in the conventional system, but this DRAM overhead can now be allocated over the entire run of pixels 111 along the skewed path 120 rather than being absorbed by just a single pixel.

This is another way, alternative to simultaneous processing mentioned earlier, of raising the number n of pixels for which a DRAM transfer is "effective". The greater the number of rows, the lower the average DRAM fetch-and-store time per pixel.

This strategy does, however, require a modest number of additional storage registers: generally speaking, registers—for each color—for each of the two pixels to the right of every intermediate pixel along the skewed path (FIG. 9). Thus a sufficient number of registers for, roughly, the two diagonals 120', 120" must be held available, and this number of registers required is roughly proportional to the number of rows in the group 110—i.e., to the number of colors times twice the number of rows. (In practice, timing and housekeeping requirements intrude to require additional registers, in number very roughly the equivalent of another half-diagonal or diagonal, so that for example in one eight-row four-color system depending on the rigor of the optimization regimen I find the number of registers is not just 2×8×4=64 but closer to eighty or one hundred.)

Since these two trends (lower DRAM time and higher register cost) counter each other, there is an optimum economic tradeoff in DRAM operations vs. register cost. Furthermore the speed of other modules in the system can be factored into this tradeoff, to avoid endowing an error-diffusion subsystem with powers that can never be exercised—or to decide that the other modules too should be upgraded.

In the illustrated system, distribution of error into each current pixel 111 (FIG. 7) is precisely the same as in FIGS. 1 through 3, geometrically—but not sequentially. Here the final distribution into each pixel 111 is made when that pixel is the left pixel (the white arrow from "&" to ":X:" in FIG. 10), i. e. from the pixel 114 that is above and to the right.

This final distribution is thus downward and to the left along a diagonal—and is associated with the shaded path 120 in a manner analogous to the next-pixel/horizontal-path association described earlier for the conventional system. In accordance with the present invention, the pixel 111 instead receives next-pixel error (the stippled horizontal arrow from "%" to ":X:") before that final distribution, and receives right- and center-pixel errors (the shaded and black arrows from "#" and "@") earlier still.

(Among the pixels illustrated in FIG. 10, distributions from the pixel labeled "#" must occur first, and those from "@" must be next—as dictated by the Floyd-Steinberg algorithm, regardless of whether the prior art or the present invention are in use. Only then can distributions be made from "%" and "&"; and these two choices represent the prior art and certain forms of the present invention respectively.)

The diagonal-path pattern is extended further downward and to the left (FIG. 8) when pixel 111 is the current pixel and distributes its error into the left pixel 117. This is the final error flowing into that pixel and—assuming that the left pixel 117 is not at the top of the next group—can accordingly be handled efficiently by placement of the error value into internal registers rather than DRAM.

This "placement" advantageously takes the form of a "holding", since the error is already in internal registers (for the current pixel). All that is needed is, in general effect, a rolling over or renaming of those registers to the left pixel, which is also the succeeding current pixel along the diagonal. Since processing is downward along the same line of pixels 120, the image data and previously stored error held in DRAM for that left pixel are readily summed to obtain the total color value for that left pixel—which is then treated as the current pixel.

In my preferred embodiment the sum, as such, of input image value and accumulated errors for the current pixel is never stored in literally a single register, although in principle the processing could be done that way. Equivalently, as will be understood by those skilled in the art, various related quantities are instead maintained in several registers of various sizes.

In this row-transverse processing, the error-diffusion hardware designer can in a natural way control or restrict the amount of internal memory required—simply by selecting the length of (e. g., number of rows to be used in) the transverse run. In other words, as suggested above the system can be configured to optimize the trade-off between time delays for use of external memory and cost of internal memory.

One excellent optimization is processing an image four rows at a time: this requires one DRAM retrieval (as previously defined for this document) every four pixels—when processing the pixel at the top of the four rows—and one DRAM deposit when processing the pixel at the bottom. The result is an average of only one-quarter each DRAM retrieval and deposit per pixel, instead of one per pixel as in the prior art.

c. Variant configurations, and edge effects—It is not strictly necessary that the transverse sequencing be angled or skewed as shown and just described. Although the skewed path appears to be ideal, other generally transverse paths are conceivable, at least in principle, and are within the scope of my invention.

Furthermore it is not strictly necessary that the principle of controllable pixel-run length be implemented through a sequence that is even generally transverse. Other sequencing appears at least theoretically feasible and again within the scope of my invention. Still another group of variants revolves about the use of simultaneous processing of plural pixels.

The introductory and informal discussion to this point accounts in detail for the simplest type of processing, for intermediate pixels—those which are at neither top nor bottom of the group 110 of rows, and which are remote from the left and right ends of the array. As will be seen in the "DETAILED DESCRIPTION" section of this document, DRAM storage becomes the topic of interest as to processing the top and bottom rows of the group—and edge effects are a much more extensive topic as to processing near the left and right ends. Also described will be several variants of the invention that affect processing of intermediate pixels.

d. Optimization—It is possible to overdo the achievement of speed objectives by making excessive use of internal memory—with resultant cost penalty and other ramifications. On the other hand, some configurations that may be "excessive" for a particular ASIC and associated system may be perfect (or not fast enough) for a more advanced ASIC and system. I have found that with the character of the tradeoffs clearly established as set forth in this document specifically for the context of error diffusion, a person of ordinary skill in this field can now proceed, with no need for further innovation, to find an optimum configuration.

There is a related essential ingredient of this analysis: what is commonly not up to the error-diffusion designer to choose are the types of memory devices themselves, or the number of access paths to certain of them. As mentioned earlier, hardware implementations for this type of system are generally shared among several different functions of the printer or multipurpose image-related device.

These other functions include some processes which must operate or otherwise interface with moving mechanical equipment, so that real-time control inputs and outputs are required. In short, the previously mentioned sharing of cost overhead with other functions is a mixed blessing, and access timing for image processing can sometimes be at the mercy of overall apparatus considerations.

The impact of such considerations on error-diffusion design, in hardware, is a recognition that reading and writing to external memory such as DRAM—even by particularly fast and efficient processes such as DMA, discussed earlier—is advantageously reduced to a minimum.

On the other hand, it is well known that using substantial hardware resources to form internal memory—or to perform elaborate extra processing steps, so as to avoid reading and writing DRAM—also carry their penalties. Thus it is important to devise ways of optimizing the tradeoff between DRAM transactions and, for instance, massive storage in internal registers.

Still another major consideration is matching the overall performance of error-diffusion blocks, in a multi-function shared hardware system, to the performance of other blocks in the system. That is, although error diffusion is classically slow, it can be made (for example through use of aspects of the present invention) so fast—relative to other blocks in the same ASIC system, for example—that its capabilities are usually idling. Such a situation represents waste capacity and wasted cost, and so should be avoided.

e. A first main aspect of the invention—Now with the foregoing informal introduction in mind, I shall proceed to a more-rigorous discussion. In its preferred embodiments, the present invention has several aspects or facets that can be used independently—though they are preferably employed together to optimize their benefits.

In preferred embodiments of a first of its facets or aspects, the invention is a system for error diffusion of image data having pixels in multiple rows. (In other words, it is assumed that the overall image is expressed in terms of multiple pixel rows of data.) The system includes calculating circuitry for processing the image data by error-diffusion procedures, to generate printing-decision data.

In addition, the system includes some means for imposing on the processing of the pixels in the image data a sequence that is generally transverse to the rows. For purposes of generality and breadth in discussing the invention, I shall refer to these means simply as the "sequence-imposing means".

The foregoing may represent a definition or description of preferred embodiments of the first aspect of the invention in its broadest or most general form. Even as thus broadly couched, however, it can be seen that this facet of the invention makes an important advance in the art.

In particular, by processing in a transverse sequence rather than in a sequence that propagates longitudinally along the rows, the invention opens a previously unused dimension geometrically, with additional degrees of freedom functionally. As will be seen, these additional functional alternatives can be exploited to reduce the time required for data transactions to external memory—and without making prohibitive demands for more internal registers or more processing time.

Although this aspect of the invention in its broad form thus represents a significant advance in the art, I prefer to practice this first aspect of the invention in conjunction with certain other features or characteristics that maximize enjoyment of the benefits of the invention. For example, it is preferable that the calculating circuitry comprise some means for making the final distribution of error into a pixel at a time when that pixel is the "left pixel".

As noted earlier this nomenclature must be understood, for present purposes, as meaning a pixel that is below the current pixel and opposite to a direction of processing—in some sense. It can now be seen that a primary direction of processing in accordance with my invention is along a path that is transverse to the row structure of the data, but that is not the sense of a "direction of processing" which is pertinent here; rather, I refer to the direction in which the path itself is successively shifted, as processing continues.

(In other words, as will shortly be seen the active path moves in a way that is very generally parallel to rows, analogously to the motion of the active pixel in the prior art. This direction of motion of the active path is the "direction of processing"—with respect to which the "left", "right" and "next" pixel are defined.)

Here I refer to distributing error into "a" pixel, rather than "each" pixel, because the preference just stated is subject to an important exception. Where the apparatus processes a group of the image-data rows together—as for example by taking such a group of rows into internal memory for processing as discussed below for the second primary facet of the invention—the final distribution of error into a pixel is preferably made at a time when that pixel is the "next pixel", if that pixel is in the first row of a group of rows that are processed together. (The "next pixel" is to be understood as defined in the foregoing paragraph.)

Another preference is that the sequence-imposing means comprise means for imposing a sequence that is skewed in relation to the order of pixels in the rows. Still further preferably the sequence-imposing means comprise means for imposing a processing sequence that is substantially at forty-five degrees to the rows. I also prefer that the sequence-imposing means comprise means for preprocessing a group of plural rows of the data by introducing a skewed structure to those plural rows of data.

f. A second main aspect of the invention—In preferred embodiments of a second facet of the invention, as in the first aspect, the invention like the first is a system for error diffusion of image data having pixels in multiple rows. This system includes internal registers of an integrated circuit, for acquiring and holding plural rows of the data at a time—that is to say, some group of rows, out of the multiple rows that make up the overall image data.

The system also includes calculating circuitry, of the same integrated circuit. The circuitry is for processing the plural rows of data in the internal registers by error-diffusion procedures, to generate printing-decision data.

The plural data rows are all processed substantially concurrently. In other words, the system takes plural rows of image data into its internal registers and works on those rows in a substantially concurrent way, rather than operating on one row at a time.

In this system, the calculating circuitry includes some means for distributing error from each pixel in at least four directions, relative to the rows of data. Again for purposes of breadth and generality I shall refer to these means as the "error-distributing means".

The foregoing may constitute a description or definition of the second facet of the invention in its broadest or most general form. Even in this general form, however, it can be seen that this second aspect of the invention, too, significantly mitigates the difficulties left unresolved in the art.

In particular, the fast internal registers can be used for intermediate results, and DRAM writing and reading operations thereby deferred—for the time involved in processing a certain number of pixels. The time consumed in DRAM transactions can be thereby in effect averaged over that number of pixels, greatly reducing the net effective time per pixel.

Although this second aspect of the invention in its broad form thus represents a significant advance in the art, it is preferably practiced in conjunction with certain other features or characteristics that further enhance enjoyment of overall benefits. These features will be explored in the "DETAILED DESCRIPTION" section that follows.

g. A third main aspect—In a third basic aspect or facet, the invention is a system for error diffusion of image data. This system includes input-data storage means for receiving and holding an array of multiple rows of data corresponding to a desired image.

These means, again for like reasons as those introduced earlier, will be called the "input-data storage means". Most typically (but not necessarily) these means may simply take the form of a memory device.

Moreover preferred embodiments of this third facet of the invention include error-diffusion calculating means, which include two components:

data-receiving means for receiving, from the input-data means, a group of plural rows of the data at a time, and calculating circuitry for processing the plural rows of data by error-diffusion procedures, to generate printing-decision data.

The foregoing may represent a description or definition of preferred embodiments of the third main facet of the invention. Even as thus broadly set forth, however, this aspect of the invention can be seen to importantly advance the art.

In particular, by taking in multiple rows of overall image data at a time, from the input-data storage means, significant time efficiencies can be achieved with respect to moving the image data into and out of the calculating system.

h. A fourth main aspect—In preferred embodiments of a fourth of its aspects, too, the invention is a system for error diffusion of image data. This system includes input-data means for holding or generating an array of multiple rows of data corresponding to a desired image.

These input-data means may (but do not necessarily) differ from the above-mentioned input-data storage means which are part of the third main aspect. Specifically, the input-data means here do not necessarily receive and hold, but may instead generate, the image data.

Thus the present system may include, as the input-data means, a scan head which for instance can create an image of an existing document to be copied—or a computer which a human operator uses to create image data or modify preexisting data to make an image file. Alternatively, however, the input-data means may be a memory device as discussed for the third aspect of the invention.

The system also includes previous-error memory means for holding error accumulated from previously processed data. Further the system includes error-diffusion calculating means, which include:

data-receiving means for receiving, from the input-data means, a group of plural rows of the data at a time, error-receiving means for receiving the accumulated error from the previous-error memory means, and calculating circuitry for combining the plural rows of data and the accumulated error by error-diffusion procedures, to generate printing-decision data.

Here it may be noted that, while the input-data means are defined more broadly than the data-receiving means of the third aspect of the invention, this fourth facet of the invention includes error-receiving means which are not necessarily present in the third aspect of the invention.

The fourth facet of the invention even as thus broadly described has important advantages over earlier developments. In particular, preferred embodiments of this aspect of the invention offer important time efficiencies as to the moving of error information to and from the calculating circuitry.

These benefits are quite distinct from the efficiencies mentioned above as to image data. Here too, important preferences are applicable to optimize the practice of this fourth facet of the invention.

i. A fifth main aspect—As to preferred embodiments of a fifth of its aspects, the invention is not apparatus but rather a method for error diffusion and printing of image data on a printing medium. The method uses digital electronic components—including an input-data memory, a previous-error memory, and electronic calculating circuitry having internal storage registers. The method also uses a printer stage that prints an image by construction from individual marks formed in pixel column-and-row arrays.

The method includes the steps of receiving, into the input-data means, an array of multiple rows of data corresponding to a desired image; and holding, in the previous-error memory, error accumulated from previously processed rows of the data. The method also includes the step of transfering, from the input-data means into the internal storage registers, a group of plural rows of the image data at a time.

Furthermore for each group of plural rows the method includes the steps of padding out data in those rows to form a skew block; and transfering, from the previous-error memory into the internal storage registers, accumulated error for pixels that are currently being processed. Also included in the method is the step of combining the plural rows of data and the accumulated error, by error-diffusion procedures, to generate printing-decision data and new error information.

This combining step includes distributing error from each pixel in at least four directions within the plural rows of data. Also the method includes the steps of transfering the new error information into the previous-error memory; and storing, in the previous-error memory means, error information accumulated from rows of the data that are currently being processed.

In addition the method includes the step of applying the printing-decision data to print an error-diffused version of the desired image. As can be seen, this method facet of the invention partakes of various advantages of the apparatus forms of the invention discussed previously.

All of the foregoing operational principles and advantages of the present invention will be more fully appreciated upon consideration of the following detailed description, with reference to the appended drawings, of which:

BRIEF DESCRIPTION OF THE DRAWINGS

FIG. 11 is a like drawing showing padding of an image-data array with dummy pixels according to preferred embodiments of the FIG. 6 implementation, for a simple print mode—shown from the point of view of a designer considering the error-diffusion process with respect to the original image data;

FIG. 12 is a like drawing for a print mode with doubled resolution in both directions;

FIG. 13 is a like drawing for a print mode with doubled resolution in only one direction;

FIG. 14 is a set of tabulations of registers (or variables) used in the implementations of FIGS. 6 through 9 and 11 through 13;

FIG. 15 is a set of tabulations of settings and proceedings for various print modes in the same implementations;

FIG. 16 is a set of tabulations of registers used in variants of the same implementations that include randomization to reduce conspicuous patterning;

FIG. 17 is a tabulation showing a register used in a "skew block" or module which precedes the error-diffusion block in an ASIC, and which in particular establishes the skewed sequencing (and preferably also performs the dummy-pixel padding) of FIGS. 11 through 13;

FIG. 18 is a set of diagrams showing how the padded-out data array appears from the point of view of a designer preparing the program by which the skew block is to insert the dummy pixels;

FIG. 19 is a further tabulation of registers used in the skew block;

FIG. 20 is a "bitpacker block" or module that follows the error-diffusion block, and which in particular formats the output data for any of the several print modes of FIGS. 11 through 13;

FIG. 21 is a related tabulation of necessary bitpacker-block setup for the supported modes;

FIG. 22 is a diagram of bit ordering in a bitpacker block with four valid rows per channel;

FIG. 23 is a like diagram for a bitpacker block with eight valid rows per channel;

FIG. 24 is a tabulation of output buffer formats for some of the configurations shown in FIG. 21;

FIG. 25 is a like tabulation for others of the FIG. 21 configurations;

FIG. 26 is a like tabulation for still others of those configurations;

FIG. 27 is a like tabulation for still others of those configurations;

FIG. 28 is a tabulation of registers (variables) used in the bitpacker block;

FIG. 29 is a block diagram of an entire ASIC according to the invention, particularly including the DRAM and the skew, error-diffusion and bitpacker blocks;

FIG. 30 is a perspective or isometric view of the exterior of one copier or multifunction image-related device for control by the FIG. 29 ASIC.

DETAILED DESCRIPTION OF THE PREFERRED EMBODIMENTS

1. ADVANTAGES OF THE INVENTION

Figure 1:
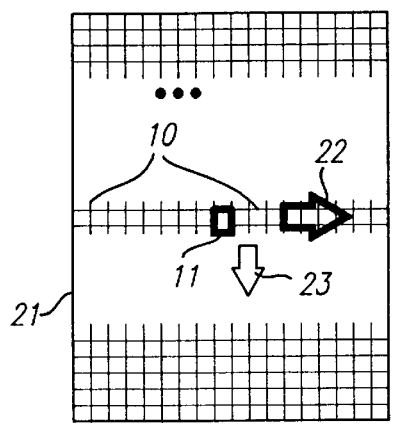
FIG. 1 is a schematic drawing showing prior-art error-diffusion data management, row by row in an image-data array.
Figure 2:
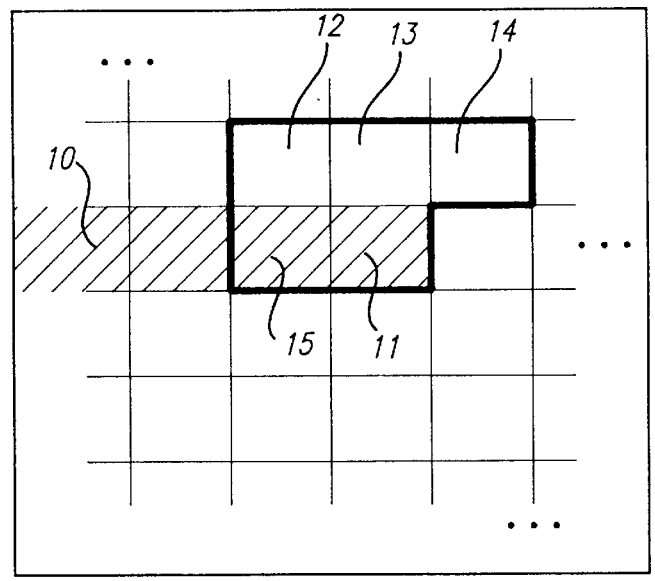
FIG. 2 is a like drawing showing—for such a prior-art system—error received in a pixel from other pixels (then-"current pixels") processed earlier.
Figure 3:
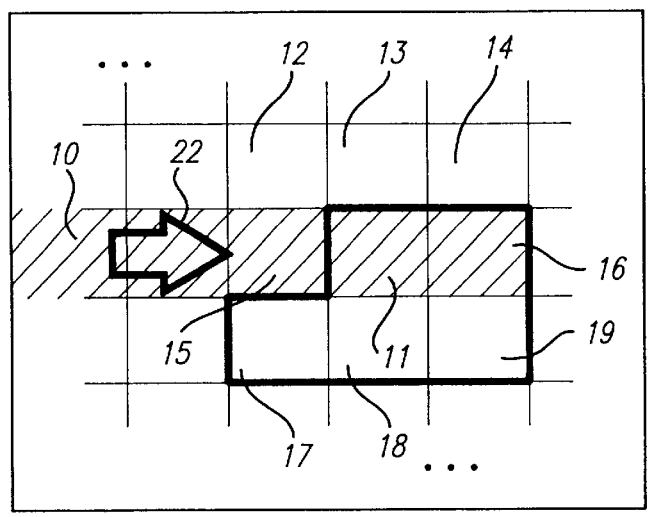
FIG. 3 is a like drawing showing—for such a prior-art system—error being distributed from a current pixel to other pixels that have not yet been published.
Figure 4:
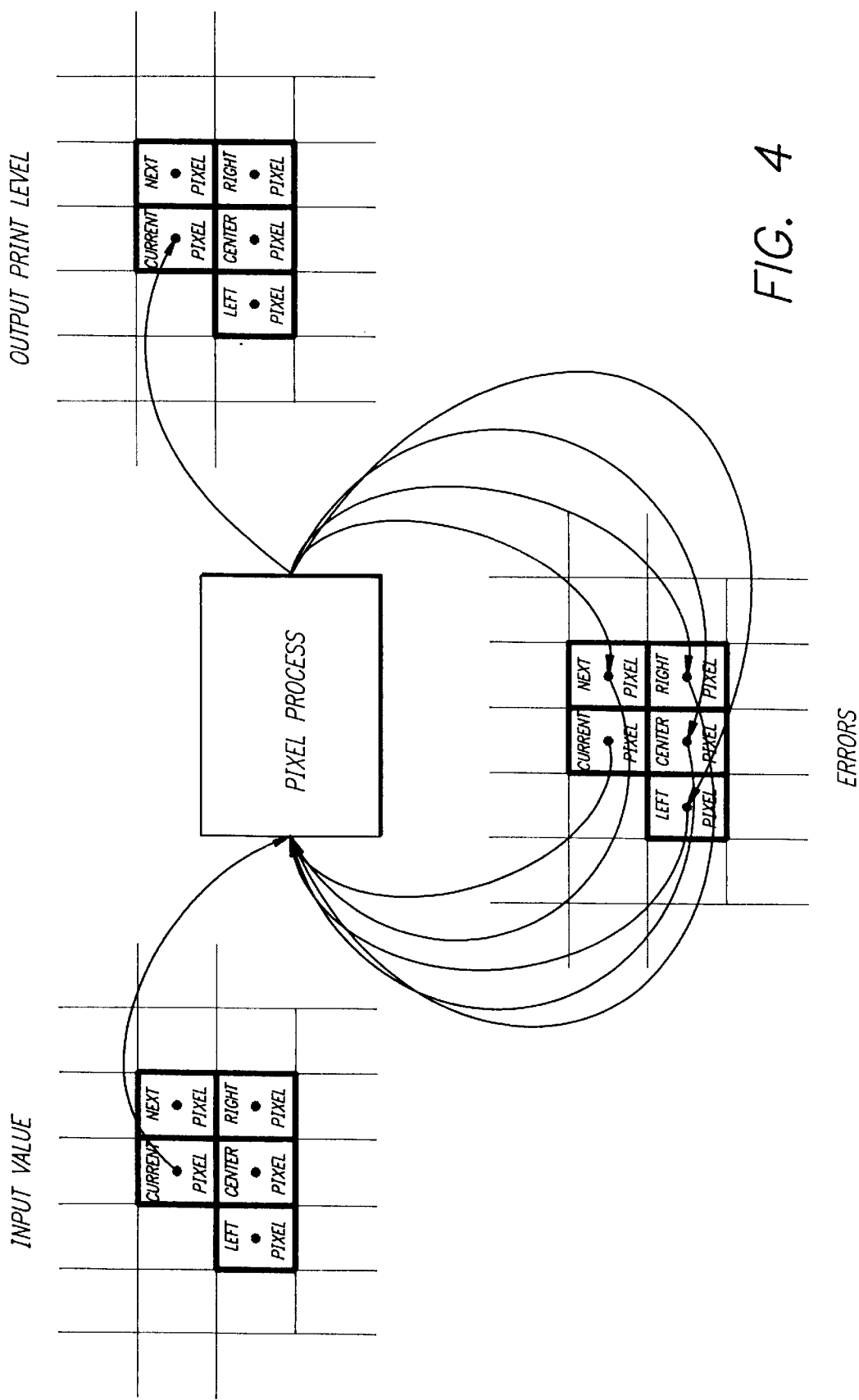
FIG. 4 is a schematic drawing showing the overall pixel process for Floyd-Steinberg or four-error error diffusion.

Because fewer DRAM transactions are required, those which are needed by my invention are spaced further apart in time, so that they do not require access to the single DRAM bus as often, or for as long in total, as in the prior row-wise system. The error-diffusion model is thus much less intrusive into the DRAM scheduling for all the other modules, and this in itself represents a major advance in the art.

Because the total time used in memory transactions is shortened, in many cases the overall ASIC throughput also may be made significantly faster directly. Since processing speed in the several stages of an ASIC depends differently on the character of an image, and because different processes can be optimized differently, it is difficult to find an accurate quantitative measure of the improvement.

Within the context of specific hardware, however, it is possible to obtain a very generalized, qualitative idea of the improvement in speed attained through replacing prior-art procedures by a particular procedure according to my invention. Such an appreciation can be garnered, for instance, for a representative combination of sixteen-bit ASIC and DRAM that are used together in certain printers and multifunction image-related devices produced by the Hewlett Packard Company.

The ASIC is a custom unit manufactured for HP by its integrated-circuit-board division in Corvallis, Oreg. The DRAM is a model KM416C1204AJ-6 available commercially from Samsung, of Seoul, South Korea—with U.S. representative in Santa Clara, Calif.

In this environment, a sixteen-bit DRAM fetch or store requires about 70 nanoseconds. Since this transfers information for two colors, a DRAM transaction for all colors in a four-color system takes 140 nanoseconds. In a typical or representative prior-art approach, each pixel requires two such transactions—a total of 280 nanoseconds per pixel.

All the other error-diffusion processing can be done in essence concurrently with this, but takes longer—very roughly some 900 nanoseconds. Thus the DRAM transactions, for each pixel, take about a third as long as the error-diffusion processing for each pixel.

Now in an economically ideal overall design all the blocks in an ASIC should run at very roughly comparable pixel throughput rates. Adding an assumption that the other parts of the error-diffusion process (i. e., not devoted to DRAM-access) are internally optimized well, the error-diffusion processing time per pixel should be comparable to the overall processing time for the whole ASIC, per pixel.

The DRAM transaction time of 280 nanoseconds per pixel can therefore be taken as—very roughly—a third of the processing time per pixel for the whole ASIC.

Considering the great number and complexity of all the other processes to be performed concurrently, one skilled in this field can appreciate that if in fact error-diffusion DRAM access were allowed to consume a third of total processing time per pixel, the error diffusion block would in fact be hogging the DRAM bus and—for images of representative or typical complexity—usually retarding the pace of the entire device.

As will be recalled, my invention does not enable conversion of all the transactions from DRAM to register transactions. DRAM transfers are still required at the top and bottom of each group of (e. g. four or eight) rows, and only the intermediate transfers or "carries" can be changed over. The overall improvement can be appreciated, qualitatively at least, in terms of an average.

By distributing or allocating each set of DRAM transactions among four or eight pixels, error-diffusion DRAM access time per pixel can be reduced from $\frac{1}{3}$ of the overall pixel processing time to only $\frac{1}{4} \times \frac{1}{3} = \frac{1}{12}$, or only $\frac{1}{8} \times \frac{1}{3} = \frac{1}{24}$—naturally a much more acceptable share.

2. SKEW AND PADDING a. *Rearranaements to accommodate sequence*—The angled or skewed processing path (FIGS. 6 through 9) which is preferred in practice of my invention diverges dramatically from the order in which pixels are received from major upstream functions of the ASIC. That latter order is substantially conventional and proceeds longitudinally along each row.

To accommodate or enable this dislocation I preprocess the data in an intermediary, a novel ASIC module or block which I call the "skew block" and which contains first-in, first-out (FIFO) registers of varying lengths to rearrange the data. While receiving pixels in the conventional order just mentioned, the skew block modifies the data sequence to feed the error-diffusion block in diagonal or skew order.

The skew block begins by sending a single pixel in the upper left corner of each group of rows, then just to the right an adjacent two-pixel-long diagonal, then a three-pixel diagonal. After reaching diagonals of full height within the row, processing continues along successive rightward diagonals—until reaching a region of progressively shorter diagonals and concluding with one pixel in the lower right corner.

Thus the system saves and processes all the data in an orderly way. Details of data rearrangement appear in a later subsection entitled "SKEW-BLOCK SETUP". In addition I have discovered that provision of the skew block serendipitously enables other benefits related to improvement of image quality, as will be described in another subsection, "IMAGE-RESOLUTION DOUBLING".

b. Special cases—Some special provisions are helpful in dealing with the pixels in the upper left-hand and bottom right-hand corners of each group 110 of rows. First the short diagonals at beginning and end of each group disrupt the otherwise-regular pattern seen in the intermediate region—i. e., a constant number of pixels in each diagonal, and therefore a constant number of beats or counts between the DRAM transactions at the top and bottom of each row-transverse run.

This irregularity is not a major difficulty, but if permitted to persist does require giving the error-diffusion block some instructions or information about the data sequence or structure. To thus complicate the otherwise repetitive part of the processing is undesirable, particularly considering that such information is required anyway in the skew block (and a following block, the bitpacker or "BitPack" block).

Other irregularities are much less onerous and readily managed within the error-diffusion block. For example of course the pixels along the top row must receive error distributions from previous storage in DRAM, rather than directly from register fetches—and as noted earlier pixels along the bottom row must make certain distributions into DRAM rather than registers—since the error in each group is handed off to the next group via DRAM.

As will now be apparent, analogous considerations apply to pixels in the lower right-hand corner of each group. There the problem is the converse: no next or right pixel exists in the image-data array to receive the conventional distributions.

Later subsections of this document will discuss various ways—which I consider relatively less desirable—in which a system can be designed to deal with these requirements. The present subsection deals only with the particular system and strategy which I prefer.

Figure 11:
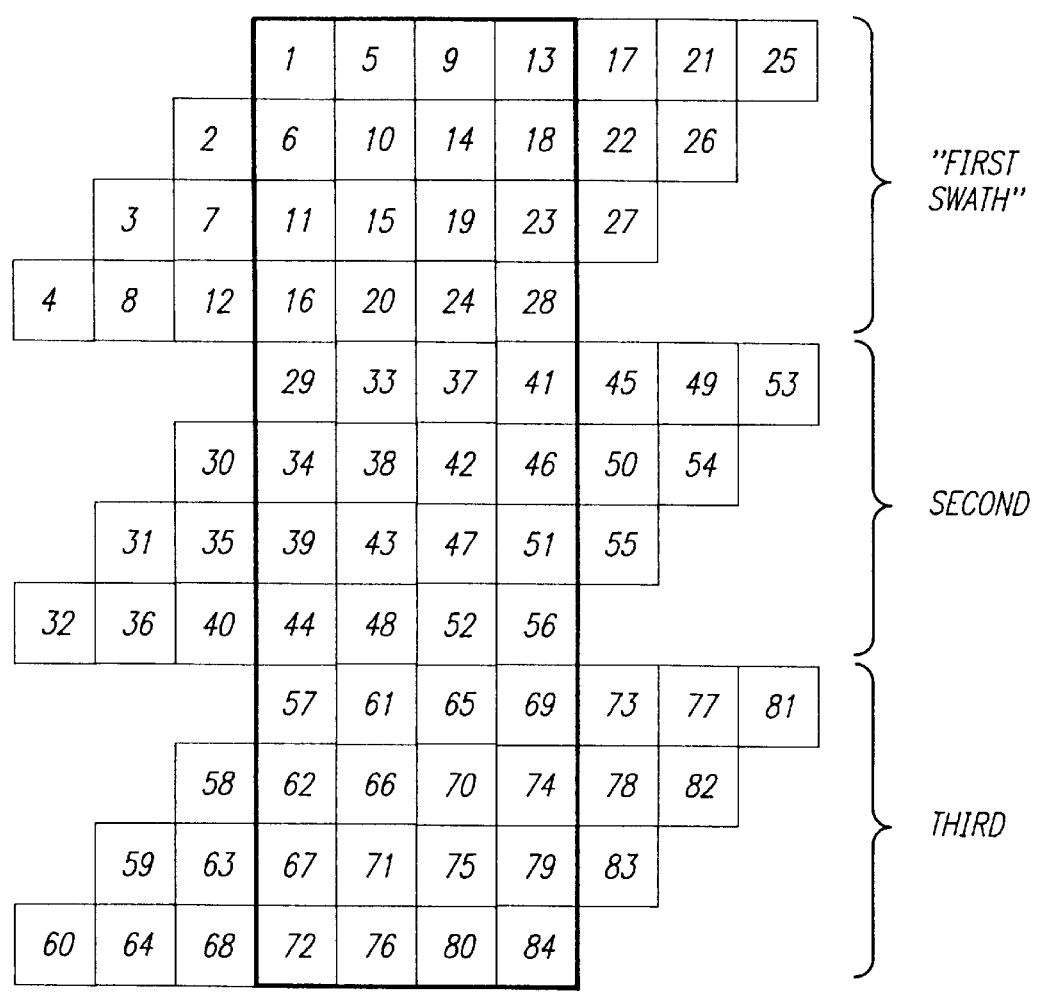

For tutorial purposes I illustrate a hypothetical narrow and shallow image-data array, only four pixels wide and twelve tall, shown within a bold rectangle (FIG. 11). It can now be see from this illustration that the conventional processing order is row-wise, i. e. 1-5-9-13, 6-10-14-18 etc.; whereas my invention calls for processing along diagonals, viz. 1, 5-6, 9-10-11, 13-14-15-16, 18-19-20 etc. (The pixel numbers used here are not the same as the callouts or reference numerals 11 through 23 in the earlier drawings.)

The awkwardly short diagonals are the first six and the last six pixels in each group or "swath". They include for example in the second swath the special-case pixels numbered 29, 33, 34, 37, 38 and 39 at top left; and 46, 47, 48, 51, 52 and 59 at bottom right.

The illustrated array is thus chosen to focus upon these special-case pixels, and in fact has just one skewed path in each group that is primarily regular—e. g., in the second swath, pixels 41 through 44. For this particular one skewed sequence, the only parts of the process which are necessarily extraordinary are reception of error at the top of the path, and distribution at the bottom, from and to DRAM rather than internal registers. (As will be seen I impose certain other limited constraints preferably, but not necessarily.)

c. Paddina with dummy pixels—In a preferred embodiment of my invention the short diagonals are substantially regularized by providing "dummy pixels", or "dumpels" into which error distributions can be made along the left edge of the array—and from which distributions can be made along the right edge. This padding is shown as triangle-shaped groups of extra pixels, e. g. pixels 2, 3, 4, 7, 8 and 12 (FIG. 11) along the left edge—and pixels 17, 21, 22, and 25 through 27 along the right.

Thus in a four-row group there are twelve special pixels in short diagonals in the original-image array, and twelve dumpels just outside that array. For a group with eight—or some other number—of rows, a corresponding other number of dumpels is used.

I prefer to place zeroes into all of the dumpels, although other choices are possible—particularly as the contents of those cells are eventually discarded. Some information flow from the dumpels into the image data, however, can occur.

In operation dumpel 2 represents registers allocated to receive left-pixel error from pixel 1. Similarly dumpel 3 represents registers that receive left-pixel error from dumpel 2, and dumpel 4 from dumpel 3—so that this skewed (mostly dummy) path 1 through 4 is regularized as to the number of beats or counts per row-transverse run.

Dumpel 7 represents registers that receive not only left-pixel error from image pixel 6, but also center-pixel error from dumpel 2 and next-pixel error from dumpel 3. Hence the entire left-side padding section is regularized; and analogous processes regularize the right-side padding section.

Now it can be seen that in FIG. 11 all the pixels—real image data and dummy pixels alike—are numbered in order of their processing. That is, the system starts with the first real image pixel 1 and proceeds in numerical order through the last such pixel 84.

This processing sequence is enabled by the skew block, which both pads out the data to the form illustrated in FIG. 11 and, more importantly as explained above, feeds the data to the error-diffusion block in the order indicated in FIG. 11. For instance the skew block receives pixel 16 before pixel 5, but doesn't send pixel 16 to the error-diffusion block until the appropriate time.

Tutorially, it is important not to become disoriented by consideration of the padding sections at left and right in FIG. 11. While the processing order is skewed, and the overall working array is skewed, the actual image data remain aligned and as mentioned earlier are within the bold rectangle.

This drawing convention focuses upon the fact that error distributions in this preferred embodiment of my invention are geometrically regular—namely, to pixels which are neighboring, strictly in accordance with the four-error paradigm of Floyd and Steinberg. The order of processing is skewed but not the image or the distribution geometry. (As may be noted in later discussion based upon drawing conventions more suited to discussion of the skew-block processes, consideration of the overall working array tends to mask the true relationships of pixels within the image and causes distributions to appear to be between noncontiguous pixels.)

d. Resulting simplification in error diffusion—By regularizing the geometry of the skewed paths, the skew block enables the error-diffusion processing itself to be very simple. In effect the skew block takes on the bulk of the responsibility for variations due to geometrical relations within the data, and the error-diffusion block for the most part merely performs a repetitive sequence of operations—i. e., by analogy to software nomenclature, a "subroutine".

In simplified form this subroutine analogue may be considered to have these steps:

1) Retrieve previous error from DRAM; process pixel.

2) Carry previous error in registers; process pixel.

3) Carry previous error in registers; process pixel.

4) Carry previous error in registers; process pixel and distribute (deposit) error to DRAM.

A subsequent module in the ASIC strips out the dummy pixels, and in effect packages the data for transmission via another DRAM unit to the printhead. That module, not entirely novel since some of its functions are conventional, is known as the "bitpacker" block.

Thus the skew and bitpacker blocks are required to have some information about the actual data structure, and desired temporary modification of that structure to facilitate error-diffusion processing. The error-diffusion block then only is required to do little more than count from one to four, performing the indicated repetitive chores at each count.

3. SIMPLIFICATIONS

I prefer to further streamline the hardware design by selectively allowing a certain very small fraction of the error data to be dropped. More specifically, error is read in from DRAM only when it is the "next-pixel error", and only written out to DRAM when it is the "left-pixel error".

In consequence the input error to the first pixel of each swath is assumed to be zero. This means, first—referring to FIG. 11 as an example—that the errors generated by pixels 4, 8 and 12 are not read in.

Since those particular pixels are only padding added by the skew block to simplify processing in the error-diffusion block, it is probably best that these pixels have no effect on the final image as printed. My next-pixel/left-pixel rule just stated, however, sweeps more broadly than this.

The error which would normally propagate directly down from pixel 16 is also ignored, as are those propagated down and to the left from pixel 20, and directly down from pixel 28. Since most images are vastly wider than four pixels, only a tiny percentage of error is being ignored and visible effect on print quality is negligible.

4. RESOLUTION DOUBLING

When a printer is capable of finer resolution along one or both directions in the image array, even if the original image was not recorded to that finer resolution my invention can improve the calorimetric accuracy of the rendition by exploiting that printer resolution capability. This technique exploits also a curious characteristic of error diffusion: the diffusion process produces a more accurate colorimetric approximation, the more finely subdivided the operating matrix itself.

To accomplish this the image data are padded out not only externally as discussed above but also internally, inserting duplicate data points in one or both directions. The error-diffusion process in effect utilizes these inserted points as a kind of interpolation bed.

The relative or fractional amount of data representing each color in each original-pixel area of the image is unchanged by the insertion. When the error-diffusion procedure works on this internally expanded matrix, however, the procedure is intrinsically better able to approach the ideal halftoning approximation.

My invention obtains this added benefit with little added cost, since the necessary operations can be performed in the skew block that has already been provided to facilitate groupwise processing as explained earlier. The bitpacker block too is readily instructed to manage the finer resolution output—without significant added cost—since that block must be prepared to deal with outputs at the finer resolution anyway.

Figure 12:
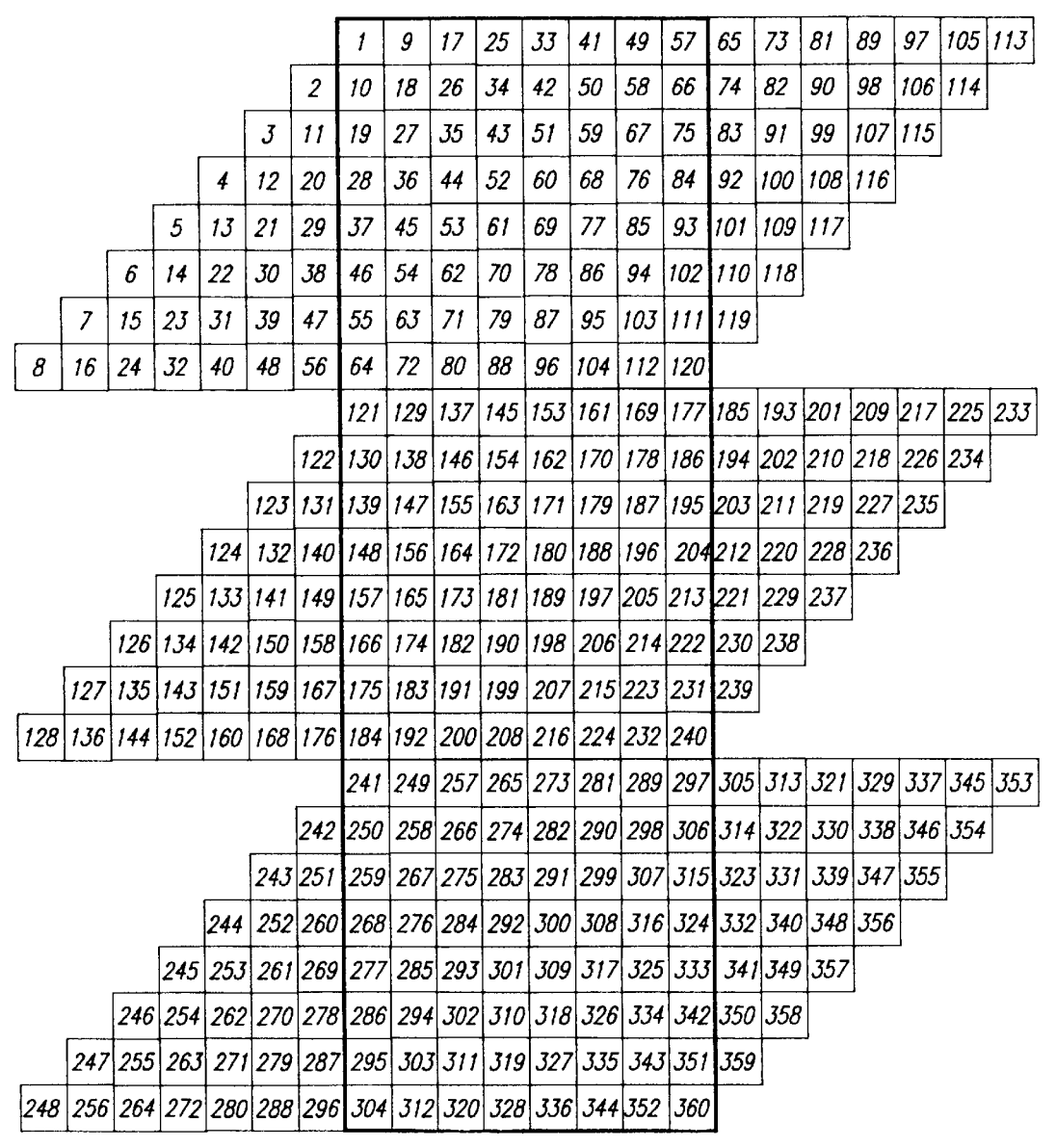

Optimum quality is obtained in this way by doubling the data in both directions. Thus each data point may be duplicated both horizontally and vertically—sometimes called "dumb quad dotted". Each original pixel, say representative pixel 10 (FIG. 11), is thereby expanded into four new pixels 35, 43, 44 and 52 (FIG. 12).

Figure 13:
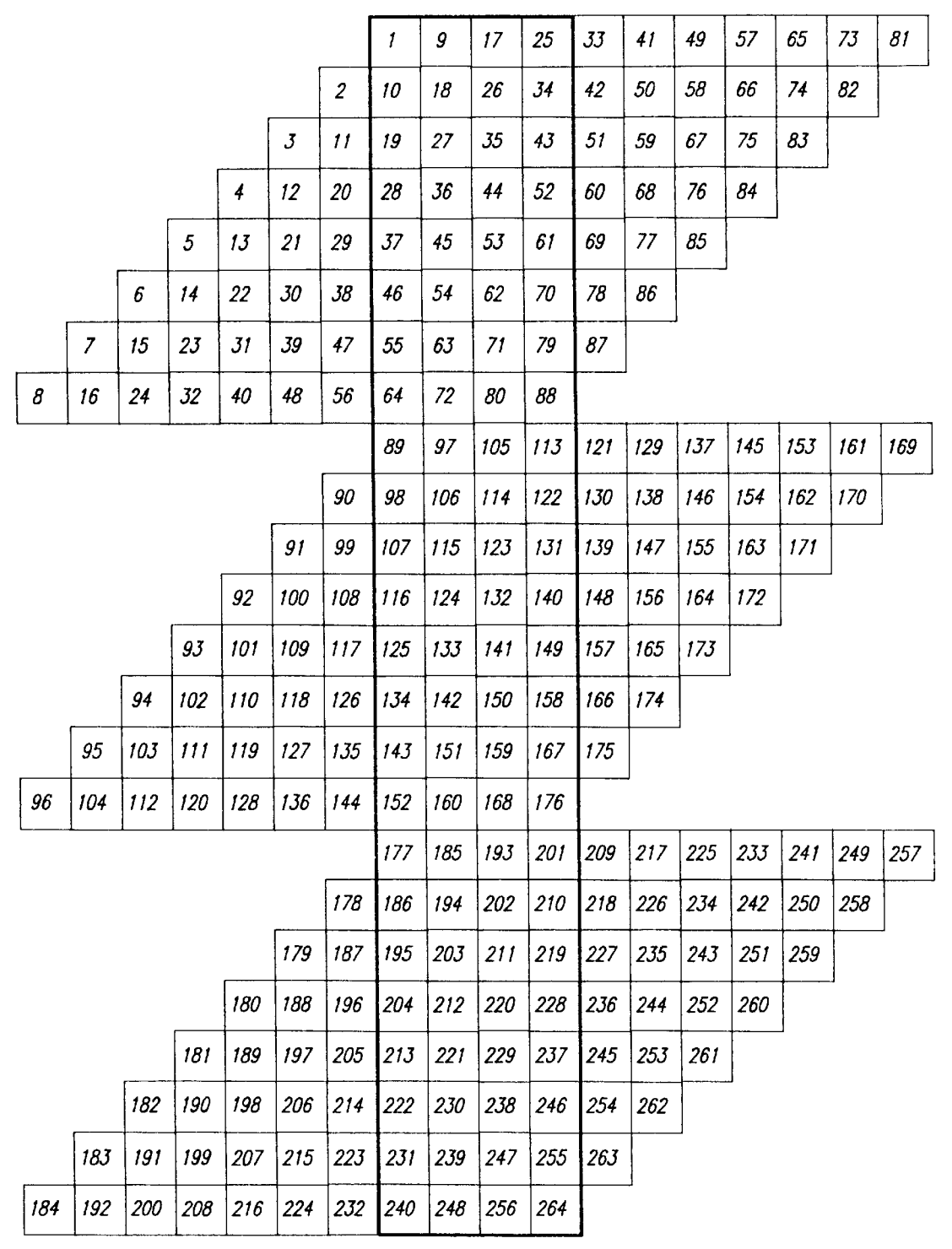

A compromise approach that e. g. allows an input scanner to operate faster, or may have other practical advantages, is achieved by doubling the data in just one direction. Here each data point may be duplicated for instance vertically— "dumb double dotted". Each original pixel 10 (FIG. 11) is expanded into just two new pixels 27 and 36 (FIG. 13).

In other environments, equivalently, data may be doubled along only the horizontal axis. This arrangement may be particularly useful, for instance, in a swath-scanning copier or printer.

In any of these cases the external padding follows the vertical expansion, if any, of the group—so that for example a twenty-eight-pixel triangular block (FIGS. 12 and 13) is inserted at each side of the expanded eight-row-tall group.

5. STRUCTURE OF THE DATA; HANDLING MODES

Preferred embodiments of my invention facilitate setting black print resolution and print levels independently of CMY color planes. Procedures for several print modes are preferably incorporated into a single ASIC, which can advantageously be designed for and used with any of several different printers.

FIG. 14 lists names assigned to registers which are used in the error-diffusion block. As will be familiar to people skilled in this field, these are also in effect the names of variables to be tracked through the process.

a. Initial configuration of error diffusion—Before starting an image, generally these four preliminaries are required:

1) The skew and bitpacker blocks must be set up compatibly with each other and for a particular selected mode.

2) The error buffer (DRAM) must be cleared—in effect initializing to zero the "previous error" that will be retrieved into each pixel of the top row of the image. The amount of memory to be cleared depends on the print mode, and on the length of the row.

3) These registers (FIG. 14) must be configured: ERRdifWrDMAAddrHiWr, ERRdifRdDMAAddrHiWr, ERRdifWrDMAAddrLoWr, ERRdifRdDMAAddrLoWr, ERRdifKShadeWr, ERRdifKthreshWr, ERRdifCshadeWr, ERRdifCthreshWr, ERRdifModeWr, and ERRdifResetWr.

4) Optionally if the random-number generator is enabled, the register ERRdifRandSeedWr should also be set up.

b. Resetting the configuration between images—Between images with identical resolution, print levels and amount of noise to be added, it is necessary to repeat only a subset of the above, namely:

1) Clear the error buffer; and
2) Write ERRdifResetWr.

c. Managing the error buffers, and setting the resolution—While the system is progressing through an image, the errors are stored temporarily in DRAM as described earlier. These errors are then read back in when they are again needed. For the top band of an image, the firmware must clear the error buffers in DRAM.

Configuring the error buffers is accomplished by first initializing the addresses of the read and write buffers. This is accomplished by setting the "rddmaaddr" and "wrdmaaddr" bits appropriately for the particular print mode and operational mode of interest—as tabulated in FIG. 15. (These two settings are sixteen-bit short word addresses, not byte addresses.)

The other preparations listed in FIG. 15 for the print/operational mode of interest should also be made.

d. Internal operation—Each color plane is processed separately. Each pixel of each color plane is processed as follows (summarizing earlier details).

Figure 5:
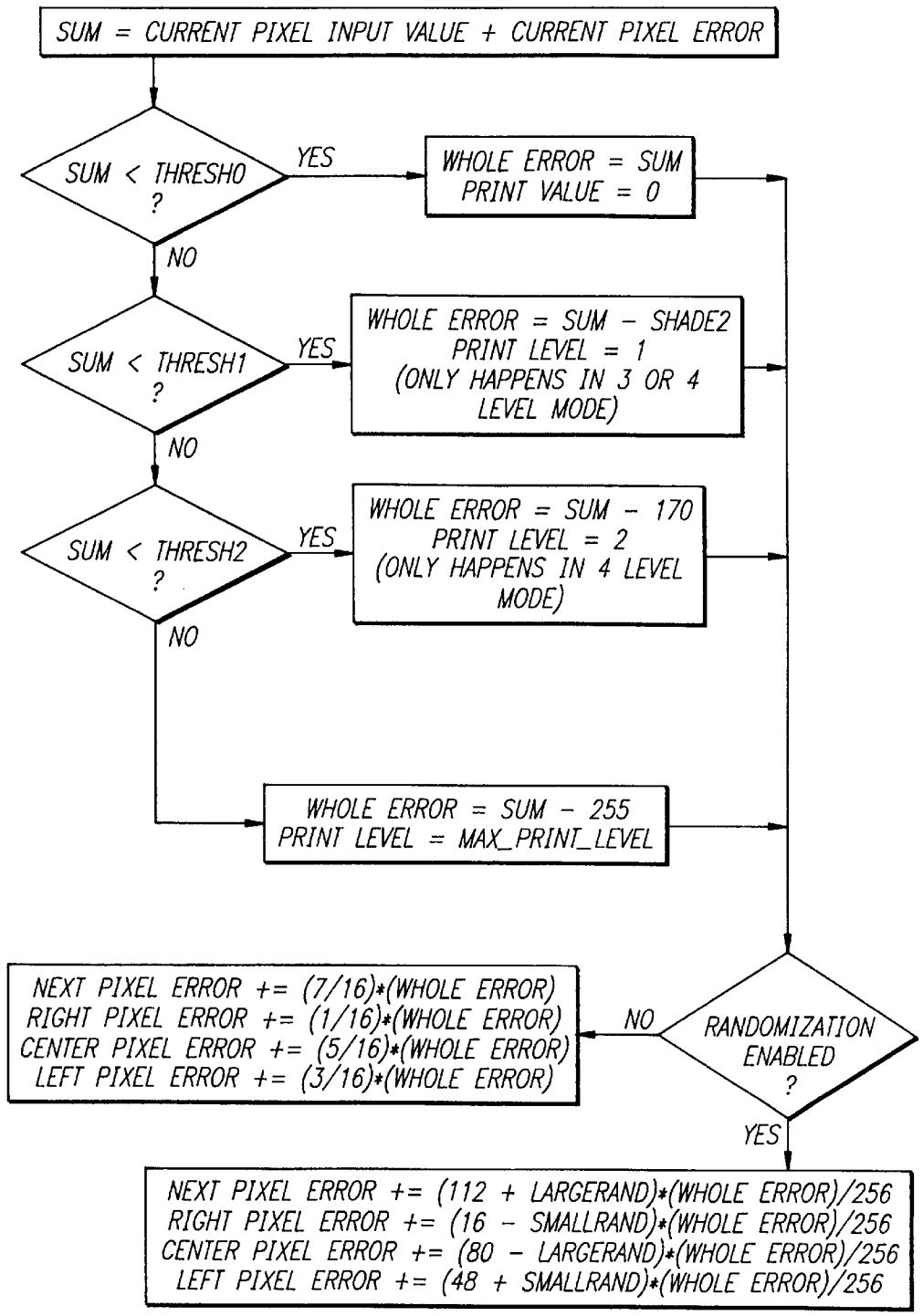
FIG. 5 is a flow chart showing the FIG. 4 process in terms of program decisions, particularly for multilevel output.
Figure 6:
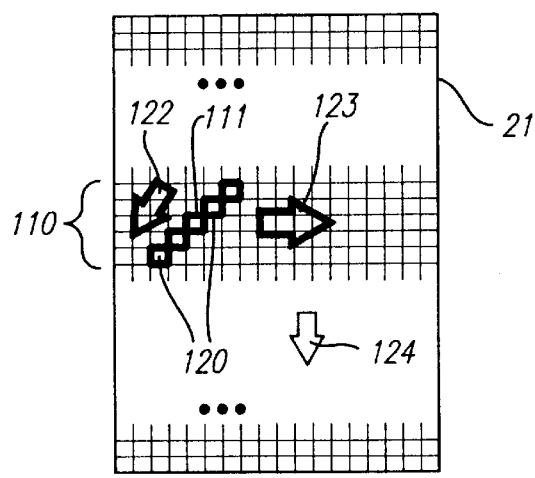
FIG. 6 is a drawing analogous to FIG. 1 but showing novel error-diffusion data management using plural rows.
Figure 7:
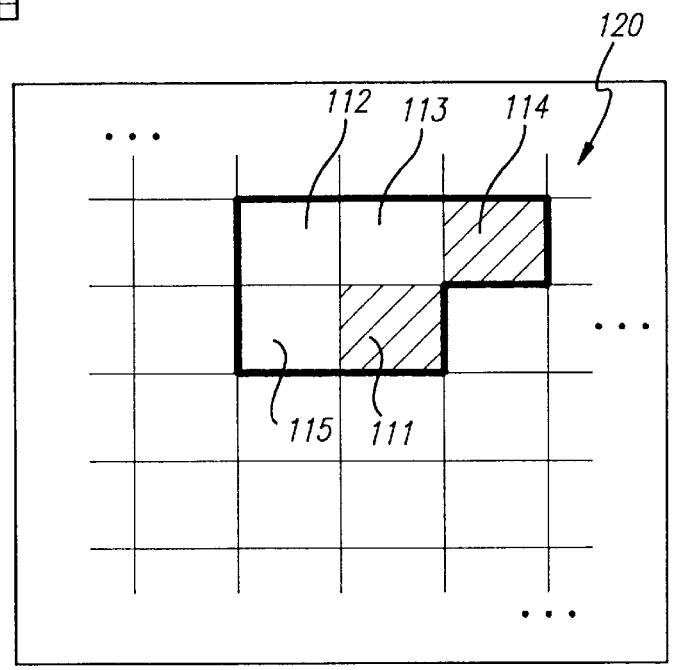
FIG. 7 is a like drawing showing—for the novel implementation of FIG. 6—error received in a pixel from other pixels processed earlier.
Figure 8:
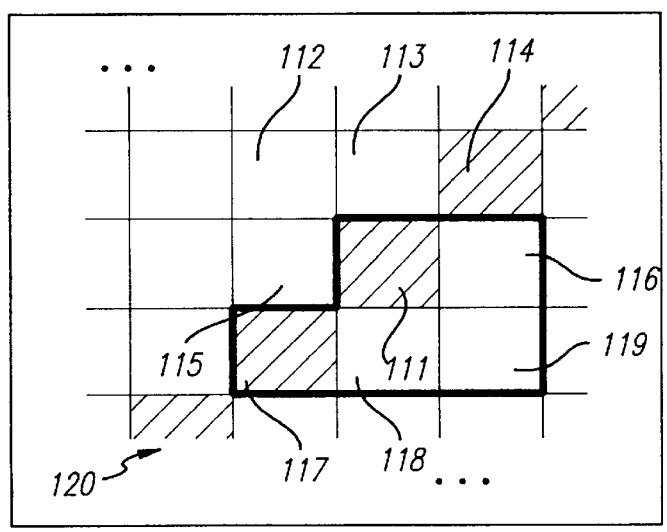
FIG. 8 is a like drawing showing, for the FIG. 6 implementation, error being distributed from a current pixel to other pixels that have not yet been processed.
Figure 9:
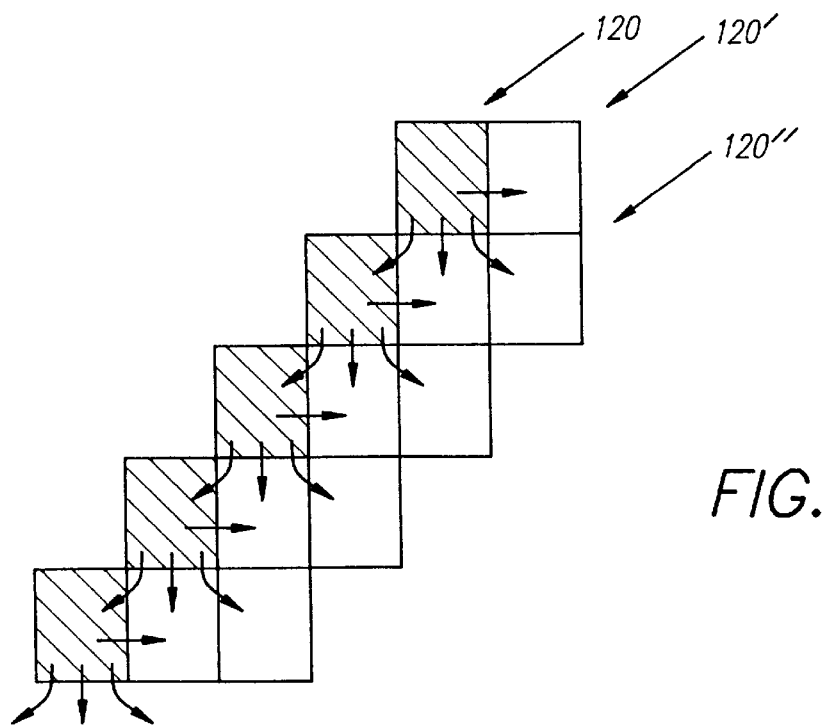
FIG. 9 is a like drawing showing for the FIG. 6 implementation how storage registers are reserved adjacent to a path of current-pixel processing.

The input pixel value from the skew block is added to the error generated by four previously processed pixels. If this sum is greater than one or more of the programed thresholds shown in the rectangles down the center of FIG. 5, a dot should print.

The dot of course has some actual color value, which in general will be different from the sum that was tested against the thresholds. This difference is called the "whole error".

The whole error is divided among four neighboring pixels, as described at length in earlier sections of this document. (As will be apparent to those skilled in the art, my invention is readily adapted to other numbers of error-receiving pixels, or to pixels differently distributed geometrically, pursuant to the numerous error-diffusion schemes found in the literature.)

For each of those pixels, the whole error is multiplied by a respective fraction, truncated to the next smaller integer and added to any error previous pixels may have already contributed. The preferred fractional values are shown at bottom right in FIG. 5 (though these values, too, are subject to great variation in accordance with different strategies described in the patent and other literature).

e. Mixed-mode processing—This type of processing is a variant of the resolution-doubling strategies discussed earlier. The first and every other row of a coarser-resolution color plane (or planes), and the first and every other column of the coarser-resolution color plane(s), are ignored.

By "ignored" I mean that the output of the error-diffusion block does not change from the previous pixel processed, and no error is read in from or written out to DRAM. As in other modes, the input error to the first pixel of a swath to be processed is assumed to be zero. Error generated by the last pixel of each swath, which would normally propagate straight down, is also ignored.

6. RANDOMIZATION

Hardware according to preferred embodiments of my invention also has the capability of randomizing the error-diffusion weights when propagating errors, to prevent distracting patterns from showing up in a printed image. Register and bit titles for this part of the program appear in FIG. 16.

Nominally the error-diffusion process causes fixed fractions of the "whole error" from each pixel to be added to the various neighboring pixels. The traditional fractional values, introduced by Floyd and Steinberg and utilized in embodiments of my invention which do not include randomization, are $7/16$ to the "next pixel", $1/16$ to the right pixel, $5/16$ to the center pixel and $3/16$ to the left pixel.

This regularity contributes undesirably to the appearance of unwanted and distracting patterns in the printed output—especially in fields of color that are uniform or nearly so. To counteract the tendency toward such patterning, the foregoing fractional weights can be treated simply as nominal values, and perturbed by random amounts.

I prefer the technique of using a linear feedback shift register to generate two random numbers, "LargeRand" (maximum range −64 to +63) and "SmallRand" (−16 to +15). When randomization is enabled these numbers are used to modify the nominal weights, as shown in the bottom limb of the final stage in FIG. 5.

As that diagram shows, each of these random values—after being divided by a constant and thereby expressed as a fraction—is added to and subtracted from certain of the nominal weights. The paired additions and subtractions are performed in such a way that the total of the weights as thus modified remains constant even though the spatial distribution varies.

For example SmallRand is divided by 256, making a fraction that can be between $-1/16$ and nearly $+1/16$. This variable fraction is then subtracted from the nominal $1/16$ weight, and also added to the nominal $3/16$ weight—so that these two weights respectively can vary from 0 to $1/8$, and from $1/4$ to $3/8$.

Because the paired modifications to the $1/16$ and $3/16$ weights are always of opposite sign, the sum of the nominal $1/16$ and $3/16$ weights as modified remains $1/16+3/16=1/4$ always. A like pairing of the random perturbations is employed to ensure that the $7/16$ and $5/16$ weights as modified add up to $3/4$ always.

If too much noise is added to an image, it can obliterate small details; but if not enough is added the intended pattern mitigation may be ineffectual. In the now-preferred embodiment of my invention, the system described in the foregoing paragraphs is considered ideal and no adjustability by the end-user is provided. For other systems it may be preferred to enable adjustment by the user, and this too is within the scope of my invention. In such cases the balance between the extremes of too much noise and not enough noise can sometimes be determined by advance visual examination (or mathematical analysis) of the image; but commonly requires printing out the finished image with various degrees of randomization and comparing the various results visually to select the best.

The amount of noise can be decreased by right-shifting the LargeRand and SmallRand values, expressed in binary form. In this way the respective ranges of those two values can be reduced, yielding −32 to +31, or −16 to +15, or −8 to +7 for LargeRand; and −8 to +7, −4 to +3 or −2 to +1 for SmallRand.

As mentioned earlier, in preferred embodiments of my invention the distribution of all errors from any given pixel occurs at substantially the same time. Such simultaneous distribution is not necessary: the errors could be kept whole until needed, and then multiplied by their respective fractions.

That approach, however, would make randomization more difficult, because somehow the randomized weights (by which each whole error is multiplied) should sum to unity for that particular whole error. Storing the weighted errors to distribute later, for instance, would require more memory and likely more memory transactions.

7. SKEW-BLOCK SETUP

The skew block in one preferred embodiment of the invention operates on thirty-two-bit CMYK pixels. It takes in pixels in column order, and outputs pixels in skewed order. This is accomplished using various registers particularly including one ("SkewCtrlWr", FIG. 17) for mode control.

a. Printing modes—Preferably five print modes (not including a pass-through mode), are supported:

| black resolution | | color resolution | |
|---|---|---|---|
| dots per mm | dots per inch | dots per mm | dots per inch |
| 12 × 24 | 300 × 600 | 6 × 12 | 150 × 300 |
| 12 × 12 | 300 × 300 | 12 × 12 | 300 × 300 |
| 24 × 24 | 600 × 600 | 24 × 24 | 600 × 600 |
| 12 × 12 | 300 × 300 | 24 × 24 | 600 × 600 |
| 24 × 24 | 600 × 600 | 12 × 12 | 300 × 300. |

The last three of these are all supported by a single mode in the skew block. In this combined mode, the skew block produces a stream of 24×24 pixels per millimeter (both black and color) and—as mentioned in subsection 5e above—the error-diffusion block is responsible for picking the correct pixels on which to operate.

b. Operation—The skew block receives pixels four rows at a time, in vertical columns. Thus in a hypothetical image just four columns wide, for the first eight rows of the image the input pixel positions and values are:

| | | | | |
|---|---|---|---|---|
| 00 | 04 | 08 | 12 | first set of |
| 01 | 05 | 09 | 13 | four input rows |
| 02 | 06 | 10 | 14 | |
| 03 | 07 | 11 | 15 | |
| 16 | 20 | 24 | 28 | second set of |
| 17 | 21 | 25 | 29 | four input rows |
| 18 | 22 | 26 | 30 | |
| 19 | 23 | 27 | 31. | |

In these tabulations, the number of a pixel describes its order of entry into the skew block (pixels are always input and output in column-major form) and will also be used as its value.

FIGS. 18a through 18c present the corresponding output pixel positions and values for the five print modes listed above. In each tabulation an italicized double zero ("00") indicates a zero-value pixel specially inserted at the beginning or end of a row, and does not signify anything about the order in which these pixels are output.

Thus in the 12×12 pixel/mm black and color mode (FIG. 18a), a three-by-three triangle of zero-value pixels is inserted at the beginning and end of each output row. To accomplish this, the data registers in the skew block include a series of progressively longer FIFOs to buffer (pad out) the bottom of each row group more than the top.

In the above-mentioned single skew-block mode that supports three printer modes (FIG. 18b), the input pixels are dumb-quad-dotted (explained in section 4 above). A seven-by-seven triangle of zero-value pixels is inserted at the beginning and end of each output row, generally in the same way as for the smaller triangle in the 12×12 mode.

In the remaining mode (12×24 black, 6×12 color) all of the input pixels are dumb-vertical-double-dotted (FIG. 18c) and a seven-by-seven triangle of zero-values pixels is inserted at beginning and end of each row. For black this concludes the preliminaries, but for the color data each pixel is averaged with its right neighbor before being output. The error-diffusion block will later discard every other column of the color output to attain resolution of six dots per millimeter.

Because the skew block pads the end of each set of input rows with zeroes, the block does not immediately finish processing data when all the inputs have been read. In a preferred embodiment of my invention, the previously mentioned mode-control register SkewCtrlWr is configured to bitmap the skew-block modes (FIG. 19).

c. Notations—Each group or swath in the tabulations of FIGS. 18a through 18c can be represented graphically this way:

with the zero-filled triangles at the ends represented by the space between the vertical and angled lines. Successive swaths thus appear so:

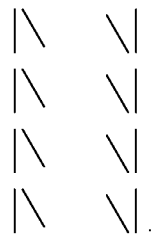

For purposes of comparison, each swath or group in the diagrams of FIGS. 11 through 13—discussed in earlier sections of this document—can be represented graphically this way:

and successive swaths:

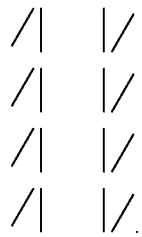

As mentioned earlier, this latter drawing convention emphasizes the geometrical relations within the true image data (between the vertical bars), whose integrity is preserved graphically by maintaining the edge bars vertical and one above another. When the data are represented in this way, error-diffusion relations appear true to form—particularly in that the pixels into which error distributions are made appear to be adjacent or contiguous.

To the contrary, when the data are represented in the manner of FIGS. 18a through 18c, diagramed as

actually-contiguous pixels in general do not appear so. Furthermore if the convention of FIGS. 18a–c is used to represent the way in which error is handed down from group to group, a still further departure would be required to portray this latter process realistically:

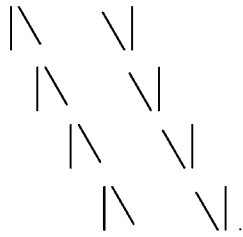

For accuracy of this portrayal, as suggested here, successive groups must be offset by the width of the triangular sections.

The representation of FIGS. 18a–c, however, is more satisfying for a designer who must think in terms of filling the data array in the skew block. That person may have no particular interest in the processes of the error-diffusion block, or in contiguousness of pixels within the image data per se, and will find any representation artificial that fails to represent the overall data array as having vertical edges. These differences of viewpoint are mentioned as they can impede communication about the invention.

8. BITPACKER

As the final stage of the image-processing pipeline, the bitpacker or "BitPack" block services more than only the error-diffusion block. It packs any of the supported data formats into sixteen-bit so-called "short words" and performs the DMA operations to place them into an output buffer.

To perform these functions the bitpacker has two independent output-DMA channels—one dedicated to black data and the other to color. Each channel is fed by a set of sixteen-bit shift registers which pack the incoming data, and each has four shift registers per colorant (four total for black, twelve for color) feeding out to its dedicated DMA.

In addition to these data registers the bitpacker has (FIG. 20) several control registers to configure resolution and to set up the block to select the valid pixels. The control registers can be programed in a multitude of configurations, some of which (FIG. 21) are valid and some of which are not.

When the input image data consist of four rows, each shift register is dedicated exclusively to a single row of a single channel. In this situation the data packing for one-, two-, four- or eight-bit modes is accomplished by shifting the most-significant bit(s) from the input into the shift register (FIG. 22). Once a shift register is filled, it is transferred to the black or color DMA for transfer to the DRAM.

When there are eight valid rows of input data for a single channel, each shift register will accept data from a pair of image rows. In this mode, only single-bit packing is allowed; therefore the odd and even rows can be packed into the high and low bytes respectively (FIG. 23).

Since the black DMA FIFO is filled by four shift registers and the color by twelve, the data are interleaved in the BitPack output buffers. Data order is determined solely by the order in which the shift registers feeding each DMA channel finish and, for the color DMA, a fixed priority of red, green and then blue in RGB systems or cyan, magenta and then yellow in CMY systems.

Because of this interleaved storage, the data will have to be retrieved with a fixed offset to read a single data plane from the output buffers. For the configurations shown in FIG. 21, the output buffer formats appear in FIGS. 24 through 27.

The several control registers serve to bitmap (FIG. 28) various functional settings and addresses needed in the bitpacker.

9. OTHER IMPLEMENTATIONS a. Padding omitted—As explained earlier, the skew block serves primarily to simplify processing in the following error-diffusion block, but does also facilitate resolution doubling (section 4 above). With the skew block in place, only the skew and bitpacker blocks have to "think"—i. e., take into account the geometry, tops and bottoms of row groups, sides of the image-data array etc.; the error-diffusion block need only know how to "count", i. e. count off the repetitive steps of its subroutine.

This approach to the overall task, however, is not the only feasible one. It would be quite practical, though not preferable, to implement my invention as defined in certain of the appended claims by instead educating the error-diffusion block to perform the necessary special-case tests and proceed accordingly.

As a result the repetitive routine performed by the error-diffusion block would be more complicated. In the absence of the dumpels described under subsection 2b above, a more-complete form of the repetitive tasks listed above in subsection 2d would be (reverting to FIG. 11): pixel DRAM retrieve DRAM deposit

| pixel | DRAM retrieve | DRAM deposit |
| --- | --- | --- |
| 1 (rec'd 1st) | YES | no |
| 5 (rec'd 2nd) | YES | no |
| 6 (rec'd 3rd) | no | no |
| 9 (rec'd 4th) | YES | no |
| 10 (rec'd 5th) | no | no |
| 11 (rec'd 6th) | no | no |
| 13–16 | —like listing in subsection 2d— | |
| 18 6th from last) | no | no |
| 19 (5th from last) | no | no |
| 20 (4th from last) | no | YES |
| 23 (3rd from last) | no | no |
| 24 (2nd from last) | no | YES |
| 28 (last) | no | YES. |

Only pixels 13 through 16 represent a regular skewed column or path, in which error is retrieved from DRAM on the first pixel and deposited to DRAM on the fourth. If the image were wider, this pattern would be repeated at every four pixels until the final six.

Although not partaking of the benefits of the skew block, implementation of my invention in this way can retain the advantages of other aspects of the invention, particularly the short run, skewed sequence, transverse processing, and operation on plural rows concurrently.

b. Horizontal runs—The transverse processing sequence is one way to introduce short processing runs, so that there is a natural stopping place for DRAM transactions before and after each run. As to four-error work, I believe that implementation of error diffusion using the smallest possible number of ASIC gates will result from the forty-five-degree down-and-left sequence (or its mirror image) discussed at length earlier in this document.

Short runs, however, can be provided in another, perhaps slightly less natural, way by segmenting the data horizontally—i. e., along rows. A simple way to represent this is by an "x" at each pixel and a bar representing each DRAM transfer:

xxxxxxxx|xxxxxxxx|xxxxxxxx|xxxxxxxx or for successive rows:

xxxxxxxx|xxxxxxxx|xxxxxxxx|xxxxxxxx xxxxxxxx|xxxxxxxx|xxxxxxxx|xxxxxxxx xxxxxxxx|xxxxxxxx|xxxxxxxx|xxxxxxxx xxxxxxxx|xxxxxxxx|xxxxxxxx|xxxxxxxx xxxxxxxx|xxxxxxxx|xxxxxxxx|xxxxxxxx xxxxxxxx|xxxxxxxx|xxxxxxxx|xxxxxxxx.

It appears from preliminary analysis that this technique would still require taking up the data in groups of rows, and probably use of a skewed sequence which may be represented thus:

xxx xxxxxxxx|xxxxxxxx|xxxxxxxx xx xxxxxxxx|xxxxxxxx|xxxxxxxx x xxxxxxxx|xxxxxxxx|xxxxxxxx x xxxxxxxx|xxxxxxxx|xxxxxxxx xx xxxxxxxx|xxxxxxxx|xxxxxxxx xxx -continued xxx xxxxxxxx|xxxxxxxx|xxxxxxxx xx xxxxxxxx|xxxxxxxx|xxxxxxxx x xxxxxxxx|xxxxxxxx|xxxxxxxx x xxxxxxxx|xxxxxxxx|xxxxxxxx xx xxxxxxxx|xxxxxxxx|xxxxxxxx xxx.

Figure 10:
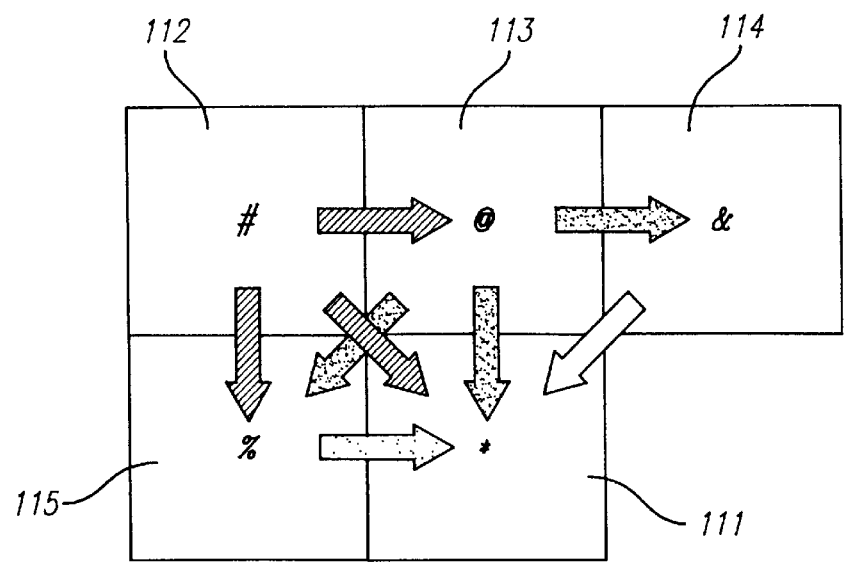
FIG. 10 is a like drawing showing the error contributions to be sequenced according to either FIG. 2 or 7.

Those skilled in the art, guided by the present disclosures, will note other equivalent ways of segmenting the data to provide short runs amenable to the holding of "carries" in internal registers as in my preferred embodiments described in detail earlier. All such equivalents are within the scope of certain of the appended claims relating to skew, groups of rows, or padding etc.

c. Vertical runs—It appears that a straight-down unskewed vertical run is out of sequence and therefore not feasible within the classical Floyd-Steinberg procedures for distribution of four errors. The reason can be seen in FIG. 10, which requires that a current pixel "·X·" (or 111) cannot be processed until it has received error from a pixel "&" (114) above and to the right.

That being so, the column to the right, the column containing pixel &, would have to be processed before the column containing @ and ·X·. On the other hand, the column to the left, containing # and %, also must be processed before the column with @ and ·X·.

The same can be said for every generalized current pixel 111 in the data, leading to the conclusion that no column can be processed before its left and right neighbors—or, eventually, no column can be processed first, or second etc., and therefore no column can be processed. (It may be noted that the analogous problem is not presented in processing row-wise, longitudinally along each row: the current pixel ·X· need not wait for error from any pixel in the row just below.) This is the reason for the inherent overall diagonal directionality of Floyd-Steinberg four-error processing from upper left to lower right (or of course in mirror-image from upper right to lower left).

This conclusion, however, may not necessarily apply to processing of certain implementations involving fewer than four errors. It has been pointed out (see e. g. Ulichney) that rather good results are available with only two or three errors distributed from each current pixel, given suitable precautions to guard against patterning. A practical vertical sequencing may be found in this way.

In theory implementation of various irregular or broken-field patterns, such as—

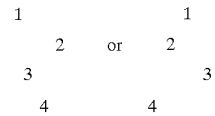

likewise may be conceivable, and perhaps some efficient way of processing such patterns may be devised. Again, all such equivalents will be found within the scope of certain of the appended claims relating to transverse sequences etc.

d. More than one pixel at a time—My invention also encompasses substantially simultaneous processing of plural current pixels. Such a system can be represented (for four-at-a-time processing) so— xxxxxxxxxxxxxxxxxxxxxxxxxxxxxxxxxxxxxxxx xxxxxxxxxxxxxxxxxxxxxxxxxxxxxxxxxxxxxxxx xxxxxxxxxxxxxxxxxxxxxxxxxxxxxxxxxxxxxxxx xxxxxxxxxxxxxxxxxxxxxxxxxxxxxxxxxxxxxxxx xxxxxxxxxxxxxx* xxxxxxxxxxx* xxxxxxxxx* xxxxxxx* which requires a high skew along the line of current pixels "$\dot{X}$", as shown—or even more skewed if desired—so that the left-pixel distributions from the upper current pixels are completed in time for use in the lower ones. The number of pixels that can be processed simultaneously is not limited to four.

In this arrangement, processing progresses longitudinally, along the rows, roughly as in the prior art systems described earlier in this document. Error distributions, DRAM and register storage, and reuse of registers all proceed in generally the same way as for those earlier systems—but plural rows are processed concurrently, or in fact substantially simultaneously This configuration requires more registers, but can be made extremely fast—in fact far too fast for the upstream blocks to keep pace, in an ASIC of particular current interest. It may be an excellent solution for an ASIC in which upstream blocks have been made considerably faster—and particularly if the previous block can be made to hand off more than one pixel at a time to the block or blocks responsible for error diffusion.

e. Other hardware types—My invention is not limited to implementation in an ASIC. The teachings in this document for memory management in error-diffusion systems have general application, and as mentioned earlier may be applied in equivalent environments.

Within the scope of the appended claims, such environments for example—but are not to be limited to—a programed logic array, or a field-programmable gate array, as well as other types of hardware not yet available or invented. Other equivalents will occur to those skilled in the art.

10. MACROSCOPIC HARDWARE a. Pipeline—A representative ASIC in accordance with my invention has numerous upstream modules, often represented graphically as solid blocks (FIG. 29) and in fact referred to as "blocks". Most of the upstream blocks are commonly organized into several upstream tiers as shown.

Dynamic random-access memory (DRAM) is represented in the drawing as numerous cylindrical-disc structures. These, however, are all only submodules—generally called DRAM "buffers"—of a single, integral DRAM unit which is obtained commercially and which has only a single data bus.

Therefore instructions for data access (whether writes or reads) by all of the ASIC blocks to their respective DRAM buffers must be mutually interleaved in an overall schedule of ASIC-DRAM communications. Many of the DRAM-access concerns that are expressed in this document flow from the necessity for such scheduling.

Data flow in a system of this type proceeds from a scanning head or other input device (or file) into DRAM, and then into the ASIC. Thereafter data flow is circulating as the successive ASIC blocks pluck specific data in particular conditions from the corresponding DRAM buffers, and then process those data and reinsert results into the same or other DRAM buffers.

The first tier ("tier 0") of the ASIC typically compensates for artifacts arising in a scanner or the like. The second and third tiers perform image filtering and color adjustments. The first few blocks in the fourth tier are devoted to further color adjustments, and to scaling calculations.

The ASIC blocks most immediately related to the present invention appear near the lower right-hand corner in the drawing. The associated "Error Buffer" in the drawing is the DRAM unit to which reference has been made generally throughout this document.

The remaining hardware in the bottom (unnumbered) tier is essentially a FIFO that reads information to and from a microprocessor that operates the printhead.

b. Image-related devices—A single ASIC, with associated DRAM, such as just described may be used in common in a variety of different products. Such compound uses have been suggested in previous sections of this document dealing, for example, with the multiple print modes of which my invention is capable.

Figure 31:
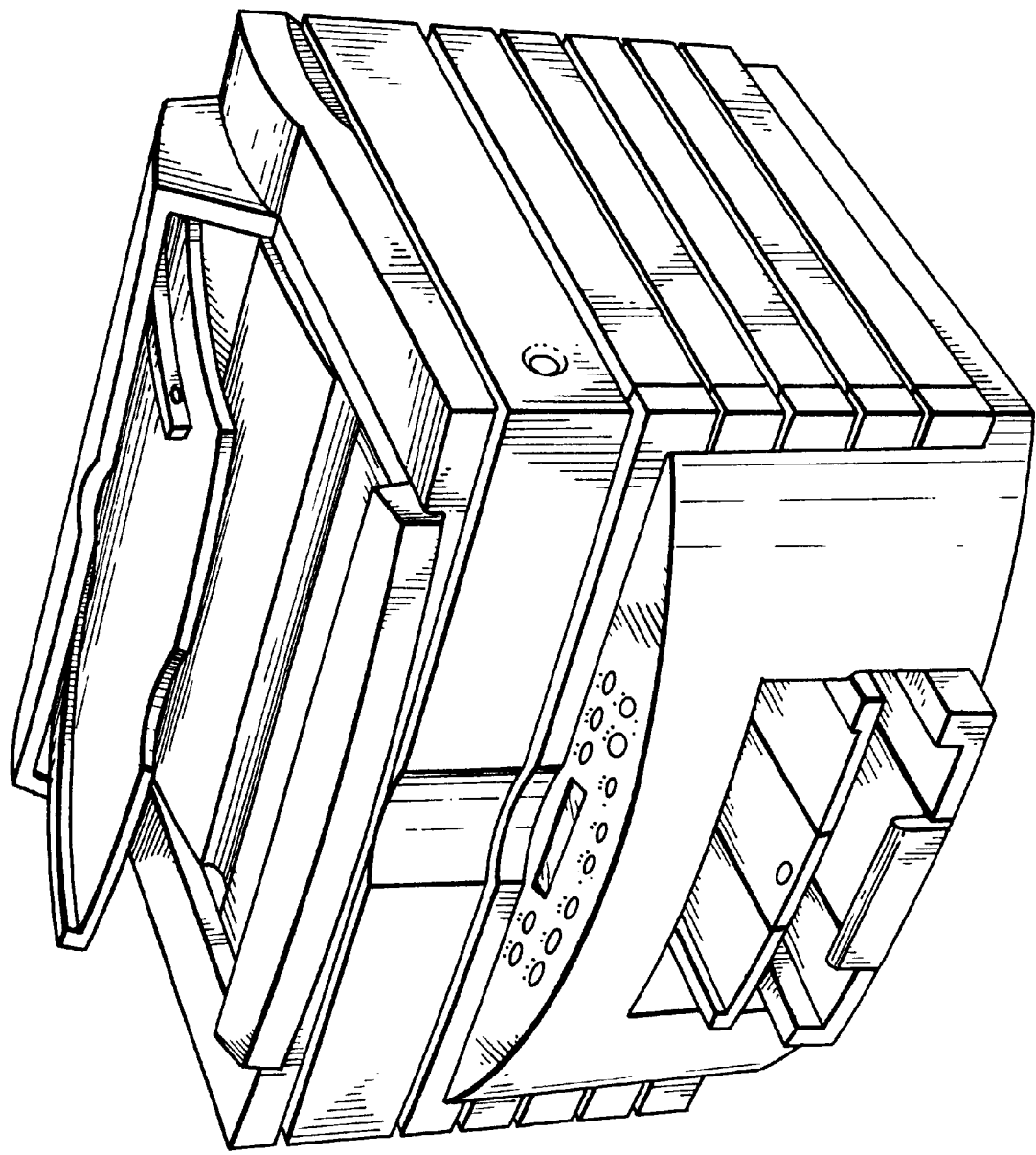
FIG. 31 is a like view for another copier or multi-function image-related device.

For example the ASIC/DRAM combination of FIG. 29 is currently used in a scanner/printer/copier device seen in FIG. 30, and also in a companion copier-only device which outwardly appears substantially the same. The identical ASIC/DRAM combination of FIG. 29 also operates in another scanner/printer/copier seen in FIG. 31—which in turn has its companion copier-only device, also appearing substantially as in FIG. 31.

On the other hand, it is possible that a printer may have the illustrated ASIC/DRAM combination installed, and may be made to employ that combination for some of the functions in the various tiers but yet, due to a bus conflict or the like, not use that already-installed ASIC for purposes of the present invention. In such a printer, error diffusion may instead be accomplished in some other fashion.

11. CONCLUSION

The above disclosure is intended as merely exemplary, and not to limit the scope of the invention—which is to be determined by reference to the appended claims.

What is claimed is:

1. A system for error diffusion of image data having pixels in multiple rows, said system comprising:

calculating circuitry for processing the imaae data by error-diffusion procedures, to generate printing-decision data; and means for imposing on said processing of the pixels in the image data a sequence that is generally transverse to said rows;

wherein said calculating circuitry comprises means for making the final distribution of error into a pixel at a time when that pixel is the "left pixel".

2. The system of claim 1, wherein:

the sequence-imposing means comprise means for making the final distribution of error into a pixel at a time when that pixel is the "next pixel", if that pixel is in the first row of a group of rows that are processed together.

3. A system for error diffusion of image data having pixels in multiple rows, said system comprising:

calculating circuitry for processing the image data by error-diffusion procedures, to generate printing-decision data; and means for imposing on said processing of the pixels in the image data a sequence that is generally transverse to said rows;

wherein the sequence-imposing means comprise means for imposing a sequence that is skewed in relation to the order of pixels in said rows.

4. The system of claim 3, wherein: the sequence-imposing means comprise means for imposing a processing sequence that is substantially at forty-five degrees to said rows.

5. The system of claim 3, wherein:

the sequence-imposing means comprise means for preprocessing a group of plural rows of the data by introducing a skewed structure to those plural rows of data.

6. The system of claim 5, wherein:

the calculating circuitry and the preprocessing means cooperate to distribute error from each pixel in several directions, substantially according to standard rules for Floyd-Steinberg error diffusion, but within said skewed data structure.

7. The system of claim 5, wherein:

the preprocessing means also insert dummy pixels to receive error distributions from the image-data pixels; and the calculating circuitry comprises means for processing the image data and dummy pixels together by error-diffusion procedures, to generate printing-decision data.

8. The system of claim 7, wherein:

the calculating circuitry and the preprocessing means cooperate to distribute error from each pixel in four directions according to standard rules for error diffusion, but as if the image data and dummy pixels together formed a parallelogram-shaped data structure with the dummy pixels extending outward at both sides of the data pixels.

9. A system for error diffusion of image data having pixels in multiple rows, said system comprising:

calculating circuitry for processing the image data by error-diffusion procedures, to generate printing-decision data; and means for imposing on said processing of the pixels in the image data a sequence that is generally transverse to said rows;

wherein the sequence-imposing means comprise means for preprocessing a group of plural rows of the data by padding out those plural rows of data with dummy pixels to receive error distributions from the image-data pixels; and the calculating circuitry comprises means for processing the padded-out data and dummy pixels together by error-diffusion procedures, to generate printing-decision data.

10. The system of claim 9, wherein:

the processing circuitry comprises means for repeating a subroutine multiple times for said transverse sequence, in processing said group of rows;

for the first pixel at the beginning of each subroutine repetition, the calculating circuitry retrieves error from relatively longterm memory;

for the last pixel at the bottom of each subroutine repetition, the calculating circuitry deposits error into relatively longterm memory; and for intermediate pixels between said first and last pixels along each subroutine repetition, the calculating circuitry does not retrieve or deposit error into relatively longterm memory.

11. The system of claim 10, wherein:

the preprocessing means further comprise means for padding out the data internally, in at least one direction relative to the image rows, with at least one duplication of substantially each pixel value; and the processing circuitry comprises means for expressing said printing-decision data at a resolution corresponding to the data as internally padded-out.

12. The system of claim 9, further comprising:

input-data storage means for receiving and holding an array of multiple rows of data corresponding to a desired image; and data-receiving means, associated with the preprocessing means, for receiving, from the input-data storage means, plural rows of data at a time for use by the preprocessing means.

13. The system of claim 12, wherein:

the data-receiving means, preprocessing means, and calculating circuitry are parts of an integrated circuit; and the input-data storage means are external to the integrated circuit.

14. A system for error diffusion of image data having pixels in multiple rows, said system comprising:

calculating circuitry for processing the image data by error-diffusion procedures, to generate printing-decision data; and means for imposing on said processing of the pixels in the image data a sequence that is generally transverse to said rows;

related apparatus for use in printing an image represented by the image data; and other calculating means for operating on the image data and controlling said related apparatus; and wherein:

the data-receiving means comprise memory devices whose effective speed is relatively fast; and the input-data storage means comprise memory devices whose effective speed is relatively slow, and access to which is shared with the other calculating means.

15. The system of claim 14:

further comprising previous-error memory means for holding error accumulated from previously processed data;

wherein the calculating circuitry further comprises error-receiving means for receiving the accumulated error from the previous-error memory means.

16. A system for error diffusion of image data having pixels in multiple rows; said system comprising:

internal registers of an integrated circuit, for acquiring and holding plural rows of the data at a time; and calculating circuitry, of the same integrated circuit, for processing the plural rows of data in the internal registers substantially concurrently, by error-diffusion procedures, to generate printing-decision data;

wherein said calculating circuitry comprises means for distributing error from each pixel in at least four directions, relative to the rows of data.

17. The system of claim 16, wherein said calculating circuitry comprises:

means for processing the plural rows of data by starting substantially along one edge, and proceeding along a generally transverse path to operate on pixels near that one edge; and means for then propagating said generally transverse process laterally toward an opposite edge.

18. The system of claim 17, wherein:

the integrated circuit further comprises preprocessing means for expanding said plural rows of data into a skewed data structure that is padded out diagonally along the opposite edges; and the very-generally vertical process comprises propagation of error diagonally, consistent with the skewed data structure.

19. The system of claim 16, wherein said at least four directions comprise:

horizontally in a first horizontal direction;

downward;

downward in the first horizontal direction; and downward opposite to the first horizontal direction.

20. The system of claim 16, further comprising:

input-data storage means, external to the integrated circuit, for receiving and holding an array of multiple rows of the image data and for supplying said plural rows of the data to the internal registers.

21. The system of claim 16, wherein:

the processing circuitry further comprises means for substantially simultaneous processing of plural current pixels.

22. The system of claim 16, wherein:

the processing circuitry further comprises means for processing of four current pixels at a time.

23. A system for error diffusion of image data, said system comprising:

input-data storage means for receiving and holding an array of multiple rows of data corresponding to a desired image; and error-diffusion calculating means, said calculating means comprising:

data-receiving means for receiving, from the input-data means, a group of plural rows of the data at a time, and calculating circuitry for processing the plural rows of data by error-diffusion procedures, to generate printing-decision data.

24. The system of claim 23, wherein:

the processing circuitry further comprises means for substantially simultaneous processing of plural current pixels.

25. The system of claim 23, wherein:

the calculating circuitry further comprises means for doubling resolution of the image data in a direction parallel to the rows, or a direction perpendicular thereto, or both.

26. The system of claim 23, wherein:

the data-receiving means comprise storage registers in the calculating circuitry;

the calculating circuitry comprises logic gates, configured to perform said processing; and the input-data storage means comprise a memory device that is external to the error-diffusion calculating means.

27. The system of claim 26, wherein:

the external memory device comprises a DRAM array.

28. The system of claim 26, wherein:

the electronic calculating circuitry is an application-specific integrated circuit, or field-programmable gate array, or programmable logic array.

29. The system of claim 23, further comprising:

related apparatus for use in printing an image represented by the image data; and other calculating means for operating on the image data and controlling said related apparatus; and wherein:

the data-receiving means comprise memory devices whose effective speed is relatively fast; and the input-data storage means comprise memory devices whose effective speed is relatively slow, and access to which is shared with the other calculating means.

30. The system of claim 23:

further comprising previous-error memory means for holding error accumulated from previously processed data;

wherein the calculating circuitry further comprises error-receiving means for receiving the accumulated error from the previous-error memory means.

31. The system of claim 30, wherein:

the data-receiving means comprise storage registers within the calculating circuitry; and the input-data storage means and the previous-error memory means are external to the error-diffusion calculating means.

32. The system of claim 23, further comprising:

a printer stage for receiving the printing-decision data and printing an error-diffused form of the desired image.

33. The system of claim 32, further comprising:

a scanner stage for generating the multiple rows of image data.

34. A system for error diffusion of image data, said system comprising:

input-data means for holding or generating an array of multiple rows of data corresponding to a desired image; and previous-error memory means for holding error accumulated from previously processed data;

error-diffusion calculating means, said calculating means comprising:

data-receiving means for receiving, from the input-data means, a group of plural rows of the data at a time, error-receiving means for receiving the accumulated error from the previous-error memory means, and calculating circuitry for combining the plural rows of data and the accumulated error by error-diffusion procedures, to generate printing-decision data.

35. The system of claim 34, wherein:

the calculating circuitry further comprises means for doubling resolution of the image data in a direction parallel to the rows, or a direction perpendicular thereto, or both.

36. The system of claim 34, wherein:

the previous-error memory means are in the form of DRAM.

37. The system of claim 34, further comprising:

a printer stage for receiving the printing-decision data and printing an error-diffused form of the desired image.

38. The system of claim 37:

further comprising a scanner stage for generating the multiple rows of image data; and wherein the input-data means comprise a DRAM array.

39. A method for error diffusion and printing of image data on a printing medium, using digital electronic components including an input-data memory, a previous-error memory, and electronic calculating circuitry having internal storage registers, and using a printer stage that prints an image by construction from individual marks formed in pixel column-and-row arrays; said method comprising the steps of:

receiving, into the input-data means, an array of multiple rows of data corresponding to a desired image;

holding, in the previous-error memory, error accumulated from previously processed rows of the data;

transfering, from the input-data means into the internal storage registers, a group of plural rows of the image data at a time;

for each group of plural rows, padding out data in said rows to form a skewed data structure;

transfering, from the previous-error memory into the internal storage registers, accumulated error for pixels that are currently being processed;

combining the plural rows of data and the accumulated error, by error-diffusion procedures, to generate printing-decision data and new error information; wherein said combining step comprises distributing error from each pixel in at least four directions within the plural rows of data;

transfering the new error information into the previous-error memory;

storing, in the previous-error memory means, error information accumulated from rows of the data that are currently being processed; and applying the printing-decision data to print an error-diffused version of the desired image.

* * * * *